United States Patent
Imai et al.

(10) Patent No.: US 12,034,114 B2
(45) Date of Patent: Jul. 9, 2024

(54) METHOD OF MANUFACTURING SOLID ELECTROLYTE SHEET, METHOD OF MANUFACTURING NEGATIVE ELECTRODE SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventors: Shinji Imai, Kanagawa (JP); Hideyuki Suzuki, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 819 days.

(21) Appl. No.: 17/033,952

(22) Filed: Sep. 28, 2020

(65) Prior Publication Data
US 2021/0013543 A1   Jan. 14, 2021

Related U.S. Application Data

(63) Continuation of application No. PCT/JP2019/014167, filed on Mar. 29, 2019.

(30) Foreign Application Priority Data

Mar. 30, 2018 (JP) .................................. 2018-068662
Dec. 27, 2018 (JP) .................................. 2018-245384
Mar. 27, 2019 (JP) .................................. 2019-060212

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/0068* (2013.01); *Y10T 29/49108* (2015.01)

(58) Field of Classification Search
CPC .......... H01M 10/052; H01M 10/0562; H01M 2300/0068; H01M 4/043; H01M 4/139;
(Continued)

(56) References Cited

U.S. PATENT DOCUMENTS 10,164,289 B2   12/2018   Visco et al.
10,553,880 B2   2/2020    Hiraiwa et al.
(Continued)

FOREIGN PATENT DOCUMENTS

CN   106688134   5/2017
CN   107258031   10/2017
(Continued)

OTHER PUBLICATIONS

"Office Action of China Counterpart Application" with English translation thereof, issued on Aug. 4, 2021, p. 1-p. 12.
(Continued)

*Primary Examiner* — Thiem D Phan
(74) *Attorney, Agent, or Firm* — JCIPRNET

(57) ABSTRACT

Provided are a method of manufacturing a solid electrolyte sheet including: a step of performing preforming on inorganic solid electrolyte particles containing solid particles plastically deformable at 250° C. or lower; and a step of performing shearing processing on one surface of the obtained preformed body, in which a solid electrolyte layer consisting of the inorganic solid electrolyte particles is formed, and a method of manufacturing a negative electrode sheet for an all-solid state secondary battery and an all-solid (Continued)

state secondary battery, which include the method of manufacturing a solid electrolyte sheet.

7 Claims, 1 Drawing Sheet

(58) Field of Classification Search
CPC ......... H01M 4/382; H01M 2300/0094; H01M 4/13; Y10T 29/49108
USPC .................. 29/623.1, 623.2, 623.3, 729, 730
See application file for complete search history.

(56) References Cited

U.S. PATENT DOCUMENTS

| | | |
|---|---|---|
| 10,840,546 B2 | 11/2020 | Visco et al. |
| 2012/0148882 A1 | 6/2012 | Bakker |
| 2016/0218349 A1* | 7/2016 | Hasegawa ............. H01M 4/623 |
| 2017/0162860 A1 | 6/2017 | Gaben |
| 2017/0301950 A1* | 10/2017 | Mimura .................. H01B 1/08 |
| 2019/0207253 A1 | 7/2019 | Makino et al. |
| 2021/0098818 A1 | 4/2021 | Visco et al. |

FOREIGN PATENT DOCUMENTS

| | | | | |
|---|---|---|---|---|
| CN | 107851810 | 3/2018 | | |
| JP | 2012094482 | 5/2012 | | |
| JP | 2013089470 | 5/2013 | | |
| JP | 2014096311 | 5/2014 | | |
| JP | 2014220177 | 11/2014 | | |
| JP | 2014220177 A | * 11/2014 | ............. | Y02E 60/10 |
| JP | 2015185462 | 10/2015 | | |
| JP | 2017168387 | 9/2017 | | |
| JP | 2017168387 A | * 9/2017 | ............. | Y02E 60/10 |
| WO | 2018047946 | 3/2018 | | |

OTHER PUBLICATIONS

"International Search Report (Form PCT/ISA/210)" of PCT/JP2019/014167, mailed on Jun. 4, 2019, with English translation thereof, pp. 1-3.
"Written Opinion of the International Searching Authority (Form PCT/ISA/237)" of PCT/JP2019/014167, mailed on Jun. 4, 2019, with English translation thereof, pp. 1-7.
"Office Action of Korea Counterpart Application" with English translation thereof, issued on Apr. 6, 2022, p. 1-p. 8.

* cited by examiner

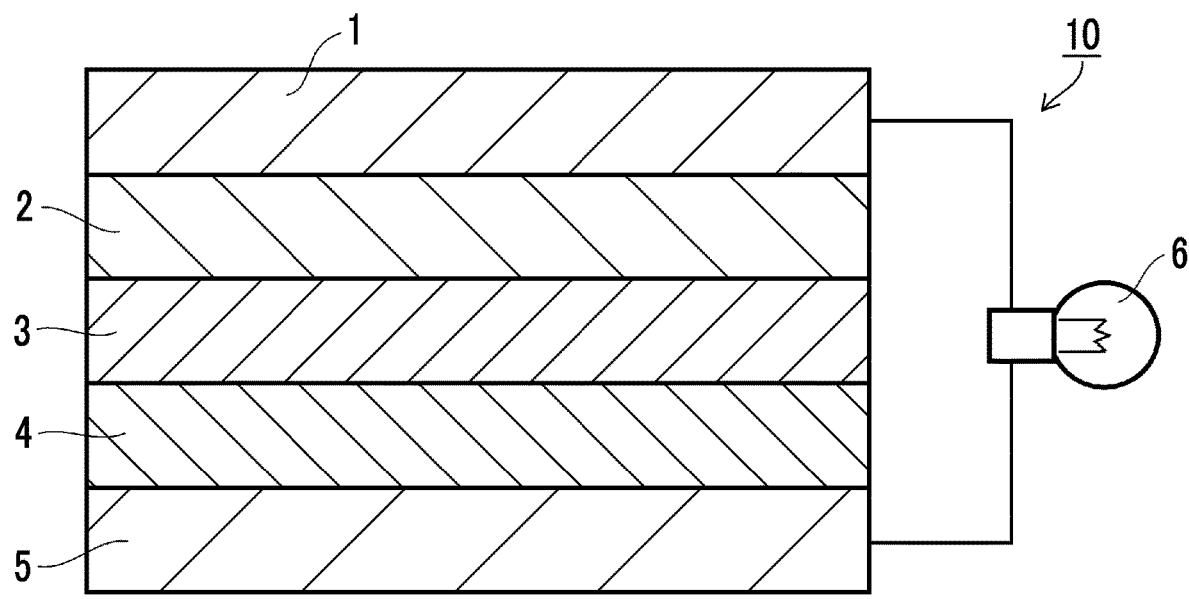

METHOD OF MANUFACTURING SOLID ELECTROLYTE SHEET, METHOD OF MANUFACTURING NEGATIVE ELECTRODE SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2019/014167 filed on Mar. 29, 2019, which claims priority under 35 U.S.C. § 119 (a) to Japanese Patent Application No. 2018-068662 filed in Japan on Mar. 30, 2018, Japanese Patent Application No. 2018-245384 filed in Japan on Dec. 27, 2018, and Japanese Patent Application No. 2019-060212 filed in Japan on Mar. 27, 2019. Each of the above applications is hereby expressly incorporated by reference, in its entirety, into the present application.

BACKGROUND OF THE INVENTION

1. Field of the Invention

The present invention relates to a solid electrolyte sheet, a negative electrode sheet for an all-solid state secondary battery, and a method of manufacturing an all-solid state secondary battery.

2. Description of the Background Art

A lithium ion secondary battery is a storage battery which has a negative electrode, a positive electrode, and an electrolyte sandwiched between the negative electrode and the positive electrode and enables charging and discharging by reciprocal migration of lithium ions between both electrodes. An organic electrolytic solution has been conventionally used in a lithium ion secondary battery as an electrolyte. However, the organic electrolytic solution is likely to leak, and a short-circuit may occur in the battery due to overcharging or overdischarging. Therefore, further improvement in safety and reliability is required.

Under such circumstances, an all-solid state secondary battery using an incombustible inorganic solid electrolyte instead of an organic electrolytic solution is being developed. The negative electrode, the electrolyte, and the positive electrode of the all-solid state secondary battery are all made of solid, and thus safety or reliability that is a problem of a battery formed of an organic electrolytic solution can be greatly improved. In addition, it is possible to achieve a longer life.

In lithium ion secondary batteries, during charging, electrons migrate from the positive electrode to the negative electrode, at the same time, lithium ions are released from a lithium oxide or the like that constitutes the positive electrode, and these lithium ions reach the negative electrode through the electrolyte and are accumulated in the negative electrode. As described above, there is a phenomenon in which some of the lithium ions accumulated in the negative electrode capture electrons and are precipitated as lithium metal. In a case where this lithium metal precipitate grows in a dendrite shape due to repeated charging and discharging, the lithium metal precipitate eventually reaches the positive electrode. As a result, an internal short-circuit occurs, so that a function as a secondary battery is lost. Therefore, it is also important in the all-solid state secondary battery to block the growth of lithium metal dendrites (simply, referred to as dendrites) in order to extend the life of a battery.

In order to deal with the problem of the internal short-circuit due to dendrites, a technique for preventing a short-circuit due to dendrites by forming a first solid layer with a smooth surface, which is heated and formed at a specific temperature condition, and a second solid layer formed on the first solid layer by a vapor phase method is described in JP2013-089470A. In addition, a technique for melting and solidifying glass after polishing a surface of a sintered body containing an oxide solid electrolyte, which does not aim at preventing an internal short-circuit due to dendrites, but which is to reduce an amount of through-holes in a solid electrolyte member (to prevent reduction of lithium capacity in a negative electrode), is described in JP2015-185462A.

SUMMARY OF THE INVENTION

Since dendrites are extremely thin and grow through cracks or pinholes formed in a solid electrolyte layer, there is room for improvement in preventing an occurrence of internal short-circuits due to dendrites. That is, in the technique described in JP2013-089470A, the surface of the first solid layer is formed to be flat, but still, the fragility of the second solid layer cannot be sufficiently compensated. In addition, in a case where cracks or fissures occur, the occurrence of internal short-circuits cannot be prevented. In addition, even in the technique described in JP2015-185462A, in a case where through-holes exist in the solid electrolyte member, the growth of dendrites cannot be suppressed.

An object of the present invention is to provide a solid electrolyte sheet in which, in a case where the solid electrolyte sheet is incorporated in an all-solid state secondary battery, an occurrence of a short-circuit of the all-solid state secondary battery can be suppressed by preventing (block) a dendrite from reaching a positive electrode even though (high-speed) charging and discharging of the all-solid state secondary battery are repeated, and a method of manufacturing a negative electrode sheet for an all-solid state secondary battery. Another object of the present invention is to provide a method of manufacturing an all-solid state secondary battery in which an occurrence of a short-circuit is suppressed.

As a result of various studies, the present inventors found that growth of dendrites on a solid electrolyte layer obtained from a preformed body can be blocked by performing shearing processing on a surface of the preformed body that is obtained by performing preforming on inorganic solid electrolyte particles containing solid particles plastically deformable at a specific temperature, and a surface on which cracks and fissures are hardly generated can be formed. In addition, the present inventors found that in a case where a solid electrolyte sheet having the solid electrolyte layer on which this surface is formed is incorporated into an all-solid state secondary battery, short-circuits can be suppressed even though the all-solid state secondary battery is repeatedly charged and discharged. The present invention was completed by repeating additional studies on the basis of the above described finding.

That is, the above described objects have been achieved by the following means.

<1> A method of manufacturing a solid electrolyte sheet comprising: a step of performing preforming on inorganic solid electrolyte particles containing solid particles plastically deformable at 250° C. or lower; and a step of performing shearing processing on one surface of the obtained preformed body, wherein a solid electrolyte layer consisting of the inorganic solid electrolyte particles is formed.

<2> The method of manufacturing a solid electrolyte sheet according to <1>, in which the step of performing the shearing processing is performed by heating the preformed body at a temperature higher than a glass transition temperature of the solid particles.

<3> The method of manufacturing a solid electrolyte sheet according to <1> or <2>, in which a vertical pressure is applied to the preformed body subjected to the shearing processing to carry out main forming.

<4> The method of manufacturing a solid electrolyte sheet according to any one of <1> to <3>, in which a film formed of a metal capable of forming an alloy with lithium is provided on the shearing processed surface of the preformed body.

<5> A method of manufacturing a negative electrode sheet for an all-solid state secondary battery, comprising forming the negative electrode active material layer on a shearing processed surface of the solid electrolyte layer in the solid electrolyte sheet manufactured by the method of manufacturing a solid electrolyte sheet according to any one of <1> to <4>, by pressure-bonding and laminating a negative electrode active material.

<6> A method of manufacturing an all-solid state secondary battery, comprising forming a positive electrode active material layer on a surface of the negative electrode sheet for an all-solid state secondary battery manufactured by the method of manufacturing a negative electrode sheet for an all-solid state secondary battery according to <5>, the surface being opposite to the negative electrode active material layer.

<7> A method of manufacturing an all-solid state secondary battery, comprising forming a positive electrode active material layer on a surface of the solid electrolyte layer in the solid electrolyte sheet manufactured by the method of manufacturing a solid electrolyte sheet according to any one of <1> to <4>, the surface being opposite to a shearing processed surface.

<8> The method of manufacturing an all-solid state secondary battery according to <6> or <7>, in which the positive electrode active material layer is formed using a positive electrode composition containing a positive electrode active material and a negative electrode active material precursor.

<9> The method of manufacturing an all-solid state secondary battery according to <8>, in which the positive electrode active material layer is formed and then charged.

<10> The method of manufacturing an all-solid state secondary battery according to <9>, in which the charged positive electrode active material layer is pressurized and compressed.

In the method of manufacturing a solid electrolyte sheet and the method of manufacturing a negative electrode sheet for an all-solid state secondary battery of the present invention, it is possible to manufacture the solid electrolyte sheet and the negative electrode sheet for an all-solid state secondary battery, in which, in a case where the solid electrolyte sheet is incorporated in the all-solid state secondary battery, the dendrite can be prevented from reaching the positive electrode and the occurrence of the short-circuit of the all-solid state secondary battery can be suppressed even though charging and discharging of the all-solid state secondary battery are repeated. In addition, in the method of manufacturing an all-solid state secondary battery, it is possible to manufacture an all-solid state secondary battery in which the occurrence of the short-circuit is suppressed.

The above described and other characteristics and advantages of the present invention will be further clarified by the following description with reference to appropriately accompanied drawings.

BRIEF DESCRIPTION OF THE DRAWINGS

FIG. 1 is a longitudinal cross-sectional view schematically illustrating an all-solid state secondary battery manufactured by a method of manufacturing an all-solid state secondary battery of the present invention according to a preferred embodiment.

DESCRIPTION OF THE PREFERRED EMBODIMENTS

In the description of the present invention, numerical ranges expressed using "to" include numerical values before and after the "to" as the lower limit value and the upper limit value.

[All-Solid State Secondary Battery]

First, an all-solid state secondary battery, a solid electrolyte sheet, and a negative electrode sheet for an all-solid state secondary battery, which are manufactured by each manufacturing method of the present invention, will be described with reference to preferred embodiments.

This all-solid state secondary battery includes a positive electrode active material layer, a negative electrode active material layer facing the positive electrode active material layer, and a solid electrolyte layer disposed between the positive electrode active material layer and the negative electrode active material layer. Other configurations are not particularly limited as long as a solid electrolyte layer manufactured by a method of manufacturing a solid electrolyte sheet according to an embodiment of the present invention described below is used as the solid electrolyte layer, and known configurations for an all-solid state secondary battery can be employed. The all-solid state secondary battery can prevent dendrites from reaching the positive electrode even though charging and discharging are repeated, and an occurrence of a short-circuit is suppressed. More preferably, even though an amount of the negative electrode active material decreases during discharging, a contact between the solid electrolyte layer and the negative electrode active material is maintained by applying a restraint force to the all-solid state battery. Particularly, in a case where lithium foil is employed as the negative electrode active material layer, a reduction of battery capacity due to charging and discharging is suppressed (a deactivation amount of lithium due to charging and discharging can be reduced), and excellent cycle characteristics are also exhibited.

In the present invention, unless otherwise specified, the negative electrode active material layer includes a layer of a metal precipitated by charging (a negative electrode active material layer in a form in which the negative electrode active material layer is not formed in advance), in addition to a preliminarily formed negative electrode active material layer (a negative electrode active material layer in a form in which the negative electrode active material layer is formed in advance).

In the present invention, each layer constituting the all-solid state secondary battery may have a single-layer structure or a multi-layer structure as long as a specific function is exhibited.

FIG. 1 is a cross-sectional view schematically showing a laminated state of each layer constituting a battery in an embodiment of the all-solid state secondary battery. An all-solid state secondary battery 10 according to the embodiment of the present invention has a structure in which a negative electrode collector 1, a negative electrode active material layer 2, a solid electrolyte layer 3, a positive electrode active material layer 4, and a positive electrode collector 5 are laminated in this order as viewed from a negative electrode side, and layers adjacent to each other are directly in contact. By employing such a structure, electrons (e) are supplied to the negative electrode side during charging, and at the same time, an alkali metal or an alkaline earth metal constituting the positive electrode active material is ionized. Then, the resultant ions pass through (conduct) the solid electrolyte layer 3 and move, and are accumulated in the negative electrode. For example, in a case of a lithium ion secondary battery, lithium ions (Li$^+$) are accumulated in the negative electrode.

On the other hand, during discharging, the above described alkali metal ions or alkaline earth metal ions accumulated in the negative electrode are returned to the positive electrode side, and thus electrons can be supplied to an operation portion 6. In an example of the all-solid state secondary battery illustrated in the drawing, an electric bulb is employed as the operation portion 6 and is lit by discharging.

In addition, the all-solid state secondary battery manufactured by the method of manufacturing an all-solid state secondary battery according to the embodiment of the present invention preferably has a form in which the solid electrolyte layer 3 and the negative electrode collector 1 are laminated without the negative electrode active material layer 2 (a form in which the negative electrode active material layer is not formed in advance). In the all-solid state secondary battery form, a negative electrode active material layer is formed by using a phenomenon in which a part of ions of a metal (alkali metal ions) belonging to Group I of the periodic table or ions of a metal (alkaline earth metal ions) belonging to Group II of the periodic table, ions being accumulated in the negative electrode collector during charging, is coupled with an electron to be precipitated as a metal on the negative electrode collector (including an interface between the negative electrode collector and the solid electrolyte, or voids in the solid electrolyte layer adjacent to the negative electrode collector). That is, in the all-solid state secondary battery form, the metal precipitated on the negative electrode collector functions as a negative electrode active material layer. For example, lithium metal is considered to have a theoretical capacity 10 times or more than graphite that is widely used as a negative electrode active material. Therefore, with a form in which lithium metal is precipitated on the negative electrode collector and the solid electrolyte layer is laminated thereon, a lithium metal layer can be formed on the negative electrode collector. As a result, it is possible to realize a secondary battery exhibits a high energy density. A battery in which the negative electrode active material layer is not formed (laminated) in advance exhibits a high energy density in order to reduce a thickness thereof.

Thus, the all-solid state secondary battery having a form in which the negative electrode active material layer is not formed in advance includes both aspects of an uncharged aspect (an aspect in which the negative electrode active material is not precipitated) and a precharged aspect (an aspect in which the negative electrode active material is precipitated). In the present invention, "the all-solid state secondary battery having a form in which the negative electrode active material layer is not formed in advance" consistently means that a negative electrode active material layer is not formed in a layer forming step in the battery manufacture, and as described above, the negative electrode active material layer is formed on the negative electrode collector by charging.

<Solid Electrolyte Layer>

The solid electrolyte layer 3 is manufactured by the method of manufacturing a solid electrolyte sheet of the present invention described later, and contains particles of an inorganic solid electrolyte having ion conductivity of a metal belonging to Group I or Group II of the periodic table, solid particles plastically deformable at 250° C. or lower, and other components within a range where the effects of the present invention are not impaired. The inorganic solid electrolyte, the solid particles, and the other components will be described later.

A surface of the solid electrolyte layer 3 on the negative electrode collector side is subjected to a shearing processing described later. The solid electrolyte layer 3 has the shearing processed surface (or the surface layer), so that it is possible to block or inhibit dendrites that grow from the negative electrode from reaching (penetrating) the positive electrode. As described above, the shearing processed surface (in a case of having a thickness, also referred to as a surface layer or a surface region) can inhibit dendrites from penetrating. Thus, the surface can also be referred to as a dendrite penetration inhibiting surface (a dendrite penetration inhibiting layer). The details of such a shearing processed surface (surface condition, surface characteristics, and the like) are not yet clear, and it is considered that a shearing force acts in a state in which the particles of the inorganic solid electrolyte and the solid particles are mixed with each other, so that the surface becomes the dendrite penetration inhibiting surface. Examples of the state or characteristics of such a dendrite penetration inhibiting surface include a surface state in which solid particles are plastically deformed (plastically flows) and thus there are no voids (this plastic deformation causes voids between the inorganic solid electrolyte particles to be filled with the solid particles), and the like. In the present invention, a void volume in the surface state having no voids is, for example, preferably 3% or less, and more preferably 1% or less. The void volume is calculated as a value (percentage) obtained such that any cross-section of the solid electrolyte layer is observed with a scanning electron microscope (SEM), the obtained SEM photograph is imaged at a magnification of 30,000 to obtain an area of a void region in a visual field of 3 μm×2.5 μm, and this area is divided by a visual field area (7.5 μm2). In a case where a thickness of the measured region is 1 μm or less, the void volume can be calculated by observing any surface instead of any cross-section of the solid electrolyte layer.

In the present invention, a thickness of the dendrite penetration inhibiting layer is not uniquely determined since the thickness varies depending on manufacturing conditions, and the like, and for example, 0.001 to 100 μm is preferable, and 0.01 to 10 μm is more preferable.

In the solid electrolyte layer 3, a region other than the surface is not subjected to the shearing processing (the shearing processing does not act as the dendrite penetration inhibiting layer is formed), and is the same as the general surface region (for example, the surface region having a void volume of more than 3% and 10% or less) which is formed of the mixture of the particles of the inorganic solid electrolyte and the solid particles.

The solid electrolyte layer generally contains no positive electrode active material and/or no negative electrode active material.

Each content of the inorganic solid electrolyte particles, the solid particles exhibiting plastic deformation, and other components in the solid electrolyte layer is the same as a content (a mixing ratio) in 100% by mass of the solid component of the preformed body described later.

<Positive Electrode Active Material Layer>

The positive electrode active material layer 4 contains an inorganic solid electrolyte having ion conductivity of a metal belonging to Group I or Group II of the periodic table, a positive electrode active material, and other components within a range where the effects of the present invention are not impaired. In an uncharged state after manufacturing the all-solid state secondary battery, one of preferable aspects contains a negative electrode active material precursor described later. The inorganic solid electrolyte, the positive electrode active material, the negative electrode active material precursor, and the other components will be described later.

Each content of the positive electrode active material, the inorganic solid electrolyte, the negative electrode active material precursor, and the other components in the positive electrode active material layer is the same as a content in 100% by mass of the solid component of the positive electrode composition described later.

<Negative Electrode Active Material Layer>

In the negative electrode active material layer 2, a negative electrode active material, preferably an inorganic solid electrolyte having ion conductivity of a metal belonging to Group I or Group II of the periodic table, furthermore a layer containing other components, lithium metal layer, and the like are employed. The inorganic solid electrolyte, the negative electrode active material, and the other components will be described later.

A lithium metal layer that can constitute the negative electrode active material layer means a lithium metal layer, and specific examples thereof include a layer formed by depositing or molding lithium powder, a lithium foil, a lithium vapor deposition film, and the like.

Each content of the negative electrode active material, the inorganic solid electrolyte, and the other components in the negative electrode active material layer is the same as a content in 100% by mass of the solid component in a negative electrode composition described later.

In the present invention, as described above, a form in which the negative electrode active material layer is not formed in advance is also preferable.

In the present invention, the negative electrode active material layer is preferably a negative electrode active material layer containing carbon materials, from the viewpoint that the volume expansion and volume contraction of the negative electrode due to charging and discharging is small, and is preferably a lithium metal layer and is particularly preferably lithium foil, from the viewpoint that the volume expansion and volume contraction of the negative electrode due to charging and discharging can be absorbed, and furthermore, the surface of the solid electrolyte layer, which is subjected to the shearing processing, can be protected. On the other hand, a form in which the negative electrode active material layer is not formed in advance is preferable from the viewpoint of the battery capacity, and a Si negative electrode is preferable from the viewpoint that high battery capacity can be achieved, and short-circuits can be effectively prevented. In a case where the negative electrode active material layer is replenished with metal ions by charging in a form in which the Si negative electrode or the negative electrode active material layer is not formed in advance, it is possible to improve the battery capacity and energy density while taking advantage of the Si negative electrode and the above described form.

<Thicknesses of Negative Electrode Active Material Layer, Solid Electrolyte Layer, and Positive Electrode Active Material Layer>

Thicknesses of the negative electrode active material layer, the solid electrolyte layer, and the positive electrode active material layer each are not particularly limited. A thickness of each layer is preferably 10 to 1,000 μm, and more preferably 20 μm or more and less than 500 μm. A thickness of the negative electrode active material layer in the form in which the negative electrode active material layer is not formed in advance varies depending on an amount of metal precipitated by charging, and thus the thickness is not uniquely determined. In the all-solid state secondary battery, at least one of the positive electrode active material layer, the solid electrolyte layer, or the negative electrode active material layer even more preferably has a thickness of 50 μm or more and less than 500 μm. In a case where the lithium metal layer is used as the negative electrode active material layer, a thickness of the lithium metal layer can be set to, for example, 0.01 to 100 μm regardless of the thickness of the negative electrode active material layer.

<Electrode Collector>

The positive electrode collector 5 and the negative electrode collector 1 are preferably electronic conductors.

In the present invention, one or both of the positive electrode collector and the negative electrode collector may be simply referred to as an electrode collector.

As materials for forming positive electrode collectors, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As materials for forming negative electrode collectors, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the electrode collector, generally, electrode collectors having a film sheet-like shape are used, but it is also possible to use net-shaped collectors, punched collectors, lath bodies, porous bodies, foaming bodies, formed bodies of fiber groups, and the like.

The thickness of the electrode collector is not particularly limited, but is preferably 1 to 500 μm.

The surface of the electrode collector is preferably provided with asperity by means of surface treatment.

<Film Formed of Metal Capable of Forming Alloy with Lithium>

In the all-solid state secondary battery according to the embodiment of the present invention, one of the aspects also preferably has a film formed of a metal capable of forming an alloy with lithium, which is described later, between the shearing processed surface of the solid electrolyte sheet and the negative electrode collector. This film formed of the metal capable of forming an alloy with lithium is generally provided on the surface of the negative electrode collector (a surface disposed on the solid electrolyte layer side) or the shearing processed surface (neither is shown in FIG. 1). This film formed of the metal is disposed between the negative electrode active material layer and the negative electrode collector in a case where the all-solid state secondary battery has the negative electrode active material layer.

In the present invention, a functional layer, a member, or the like may be appropriately interposed or arranged between or outside respective layers of the negative electrode collector, the negative electrode active material layer, the solid electrolyte layer, the positive electrode active material layer, and the positive electrode collector. In addition, the respective layers may be composed of a single layer or multiple layers.

<Housing>

Depending on applications, the all-solid state secondary battery manufactured by the method of manufacturing an all-solid state secondary battery according to the embodiment of the present invention may be used as the all-solid state secondary battery with the above described structure, but, in order to have a form such as a dry battery cell, the all-solid state secondary battery is also preferably further sealed in an appropriate housing. The housing may be made of metal or resin (plastic). In a case where a metal housing is used, examples thereof include an aluminum alloy housing and a stainless steel housing. It is preferable that the metal housing is separately used as the housing for the positive electrode and the housing for the negative electrode, and the housing for the positive electrode and the housing for the negative electrode are electrically connected to the positive electrode collector and the negative electrode collector, respectively. It is preferable that the housing for the positive electrode and the housing for the negative electrode are bonded together through a gasket for short-circuit prevention and are thus integrated.

[Solid Electrolyte Sheet]

The solid electrolyte sheet manufactured by the method of manufacturing a solid electrolyte sheet of the present invention is provided with a solid electrolyte layer, and is a sheet-shaped foamed body may be used as the solid electrolyte layer of the all-solid state secondary battery.

In a case where the all-solid state secondary battery has the form in which the negative electrode active material layer is not formed in advance, this solid electrolyte sheet can also be suitably used as a solid electrolyte layer (a solid electrolyte layer adjacent to this negative electrode collector in an aspect having a negative electrode collector) on which the negative electrode active material layer is formed (lithium metal is precipitated). In this case, the solid electrolyte sheet preferably includes a film formed of a metal capable of forming an alloy with lithium directly or through another layer on the shearing processed surface.

In addition, this solid electrolyte sheet can also be suitably used in manufacturing the negative electrode sheet for an all-solid state secondary battery described later. Furthermore, the solid electrolyte sheet can also be used of manufacturing the positive electrode sheet for an all-solid state secondary battery.

In a case of referring to the solid electrolyte sheet of the present invention, the all-solid state secondary battery according to the embodiment of the present invention is configured to have the positive electrode active material layer on a surface opposite to the surface of the solid electrolyte layer in the solid electrolyte sheet, on which the negative electrode collector is provided.

This solid electrolyte layer on which the solid electrolyte sheet is provided is the same as the solid electrolyte layer described in the above described all-solid state secondary battery, the description is not repeated.

The solid electrolyte sheet does not have a layer that serves as the negative electrode active material layer of the all-solid state secondary battery, but may include a base material, a film formed of a metal capable of forming an alloy with lithium, and furthermore other layers, or the like in addition to the solid electrolyte layer.

The base material is not particularly limited as long as the base material can support the solid electrolyte layer, and examples thereof include a sheet (plate) formed of materials described in the above electrode collector, organic materials, inorganic materials, and the like. Examples of the organic materials include various polymers, and specific examples thereof include polyethylene terephthalate, polypropylene, polyethylene, cellulose, and the like. Examples of the inorganic materials include glass, ceramic, and the like.

The film formed of a metal capable of forming an alloy with lithium is not particularly limited as long as the film is a metal film formed of a metal capable of forming an alloy with lithium. Examples of the metal capable of forming an alloy with lithium include each metal such as Zn, Bi, Mg in addition to Sn, Al, In, and the like, which will be described later in the negative electrode active material. Among these, Zn, Bi, and the like are preferable.

A thickness of this metal film is not particularly limited, but is preferably 300 nm or less, more preferably 20 to 100 nm, and even more preferably 30 to 50 nm.

In a case where a solid electrolyte-containing sheet having the above described metal film is incorporated into the all-solid state secondary battery having the form in which the negative electrode active material layer is not formed in advance, it is possible to effectively control a precipitation state of the lithium metal due to charging, and to further effectively suppress an occurrence of short-circuits (the time until a short-circuit occurs can be lengthened (the number of charging and discharging cycles can be increased)). That is, since lithium metal is precipitated by forming an alloy with a metal forming a metal film uniformly disposed at an interface with the solid electrolyte layer due to charging, local precipitation of the lithium metal can be suppressed. Thereby, it is considered that dendrites can be effectively prevented from reaching the positive electrode.

Examples of other layers include a protective layer (a peeling sheet), an electrode collector, a coating layer, a positive electrode active material layer, and the like. The solid electrolyte sheet, particularly the solid electrolyte sheet used in the form in which the negative electrode active material layer is not formed in advance (for example, the solid electrolyte sheet having the above described metal film), preferably includes a negative electrode collector on an opposite side of the metal film to the solid electrolyte layer.

In a case of including a positive electrode active material layer as another layer, the positive electrode active material layer is provided on an opposite side to the shearing processed surface of the solid electrolyte layer, and preferably includes a positive electrode collector on an opposite side of the positive electrode active material layer to the solid electrolyte layer. In the present invention, the solid electrolyte sheet including the positive electrode active material layer is also referred to as a positive electrode sheet for an all-solid state secondary battery. The positive electrode active material layer and the solid electrolyte layer, which are provided on this positive electrode sheet for an all-solid state secondary battery, are the same as the positive electrode active material layer and the solid electrolyte layer described in the above described all-solid state secondary battery, and thus the description is not repeated.

In the present invention, the solid electrolyte sheet, the following negative electrode sheet for an all-solid state secondary battery, and the positive electrode sheet for an all-solid state secondary battery can be collectively referred to as an all-solid state secondary battery sheet, and the solid electrolyte sheet is a concept including a positive electrode sheet for an all-solid state secondary battery.

[Negative Electrode Sheet for All-Solid State Secondary Battery]

The negative electrode sheet for an all-solid state secondary battery manufactured by the method of manufacturing a negative electrode sheet for an all-solid state secondary battery according to the embodiment of the present invention is provided with a negative electrode active material layer and a solid electrolyte layer, and preferably, the negative electrode active material layer and the solid electrolyte layer are laminated such that the surface of the negative electrode active material layer and the shearing processed surface of the solid electrolyte layer are in contact with each other. This negative electrode sheet for an all-solid state secondary battery is a sheet-shaped foamed body that may be used as the negative electrode active material layer and the solid electrolyte layer of the all-solid state secondary battery.

In a case of referring to the negative electrode sheet for an all-solid state secondary battery of the present invention, the all-solid state secondary battery according to the embodiment of the present invention has a configuration in which the positive electrode active material layer is formed on the opposite surface of the negative electrode sheet for an all-solid state secondary battery to the negative electrode active material layer.

The negative electrode active material layer and the solid electrolyte layer, which are provided on this solid electrolyte sheet, are the same as the negative electrode active material layer and the solid electrolyte layer described in the above described all-solid state secondary battery, and thus the description is not repeated.

The negative electrode sheet for an all-solid state secondary battery may have a base material (electrode collector), other layers, or the like, in addition to the negative electrode active material layer and the solid electrolyte layer. The base material and the other layers are as described above.

[Manufacturing Method of the Present Invention]

Next, the method of manufacturing an all-solid state secondary battery according to the embodiment of the present invention will be described together with the method of manufacturing a solid electrolyte sheet of the present invention and the method of manufacturing a negative electrode sheet for an all-solid state secondary battery of the present invention.

In a case of manufacturing the all-solid state secondary battery, a solid electrolyte sheet, and furthermore, a negative electrode sheet for an all-solid state secondary battery, or the like are appropriately prepared. The solid electrolyte sheet is manufactured by the method of manufacturing a solid electrolyte sheet of the present invention.

<Method of Manufacturing Solid Electrolyte Sheet>

The method of manufacturing a solid electrolyte sheet of the present invention is a method of forming a solid electrolyte layer by performing the following Step A and Step B in sequence.

In the present invention, "performing steps in sequence" means a before and after relation in the time elapsed for performing a certain step and another step, and includes an aspect performing other steps (including a rest step) between the certain step and the other step. In addition, the aspect in which the certain step and the other step are performed in sequence includes an aspect performed under a condition of time, place, or practitioner being appropriately changed.

Step A: a step of performing preforming on inorganic solid electrolyte particles containing solid particles plastically deformable at 250° C. or lower Step B: a step of performing shearing processing on one surface of a preformed body obtained in the step of performing preforming.

In the method of manufacturing a solid electrolyte sheet of the present invention, the following step C is preferably performed after the above step B (the step A, step B, and step C are performed in sequence), and more preferably a step D is performed.

The order of performing the step C and the step D is not particularly limited. In a case of performing the step D after step C, "on the shearing processed surface of the preformed body" in the following step D means "the shearing processed surface of the solid electrolyte layer".

Step C: a step of applying a vertical pressure to the preformed body obtained in the step B to perform main forming Step D: a step of providing a film formed of a metal capable of forming an alloy with lithium on the shearing processed surface of the preformed body (Step A: Preforming Step)

In a case of executing the step A, inorganic solid electrolyte particles containing solid particles plastically deformable at 250° C. or lower is prepared as a preforming material. The inorganic solid electrolyte particles containing the solid particles plastically deformable at 250° C. or lower generally mean a mixture of the solid particles plastically deformable at 250° C. or lower and the inorganic solid electrolyte particles. However, in a case where the inorganic solid electrolyte particles correspond to solid particles plastically deformable at 250° C. or lower (for example, sulfide-based inorganic solid electrolytes), it is possible to use a mixture of the inorganic solid electrolyte particles and other inorganic solid electrolytes (that do not plastically deform at 250° C. or lower), and furthermore only one kind or two or more kinds of inorganic solid electrolyte particles (an inorganic solid electrolyte particle group) plastically deformable at 250° C. or lower. In the present invention, an aspect in which the solid particles plastically deformable at 250° C. or lower and sulfide-based inorganic solid electrolytes as the inorganic solid electrolyte are used is preferable. The solid particles and the inorganic solid electrolyte particles used as the preforming material may be one kind or two or more kinds, respectively.

-Solid Particles Plastically Deformable at 250° C. or Lower-

The solid particles plastically deformable at 250° C. or lower (hereinafter, referred to as plastic solid particles) are not particularly limited as long as the particles have characteristics or physical properties that can plastically deform at 250° C. or lower. In a case of using such particles, through the step B described later, it is possible to block the growth of dendrites on a surface of the preformed body, and cracks and fissures are hardly generated on the surface.

Examples of the plastic solid particles include sulfide-based inorganic solid electrolytes, diphosphorus pentoxide, and a boron nitride-sulfur mixture described later. Among these, sulfide-based inorganic solid electrolytes are preferable. These plastic solid particles may be appropriately synthesized, or commercially available products may be used. Examples of a method of synthesizing a boron nitride-sulfur mixture include the following method. That is, after scale-like hexagonal boron nitride (hBN) having a long side of 0.4 µm and sulfur are set to a mass ratio of 1:2 and mixed in a mortar, hot pressing is performed under conditions at a temperature of 170° C. and a pressure of 130 MPa to obtain a film body, and the obtained film body is ground in a mortar to be powder. Thereby, it is possible that space between the scale-like hBN particles is filled with the hot-melted sulfur to form solid particles exhibiting plastic deformability.

Whether or not the plastic solid particles are particles having the characteristics or physical properties that can plastically deform at 250° C. or lower can be determined as follows. That is, an indentation test is performed by a micro hardness tester using a Berkovich indenter with a maximum indentation load of 100 mN, a load time of 10 seconds, a creep of 5 seconds, and an unloading time of 10 seconds. From a displacement-load curve obtained before and after the indentation test with no specimen damage after the test, in a case where a difference between a press-fitting depth after creep and a press-fitting depth after unloading is 10% or more of the press-fitting depth after creep, it is determined that there are the characteristics that can plastically deform. The upper limit of the measurement temperature is 250° C., and a measurement is performed at a temperature at which plastic deformation is possible. Specifically, in a case where the difference is 10% or more until the measurement temperature reaches 250° C., the solid particles plastically deformable at 250° C. or lower. The indentation load is set to be about 1/10 of a film thickness in a film used as a test piece and obtained by forming plastic solid particles so as to obtain information on the entire specimen.

The plastic solid particles preferably have a glass transition temperature. It is possible to effectively prevent defects such as cracks and fissures which may occur on the shearing processed surface of the preformed body from occurring by performing the shearing processing at a temperature higher than the glass transition temperature of the plastic solid particles. The glass transition temperature of the plastic solid particles is not particularly limited, but is, for example, preferably 70° C. to 250° C., and more preferably 75° C. to 200° C. Regarding a method of measuring the glass transition temperature, about 2 mg of plastic solid particles can be measured with a sealed cell differential scanning calorimeter (SC-DSC) at a temperature rising rate of 10° C./min and can be measured from an exothermic peak. An airtight container made of stainless steel is used to set the atmosphere in the container to be a nitrogen gas atmosphere.

In the present invention, in a case where the plastic solid particles have a plurality of glass transition temperatures, temperature conditions of the steps A, B, and C (in a case of being based on the glass transition temperature) are preferably based on the lowest glass transition temperature.

In the plastic solid particles, a relationship between a plastic deformation temperature and a glass transition temperature is preferably the following description. That is, the plastic deformation temperature is preferably lower than the glass transition temperature, and in a case where a plurality of glass transition temperatures are confirmed, an aspect in which a temperature is preferably lower than the lowest glass transition temperature is preferable.

A particle diameter (a volume average particle diameter) of the plastic solid particle is not particularly limited, but is preferably 0.05 µm or more, and more preferably 0.1 µm or more. The upper limit is preferably 10 µm or less and more preferably 1 µm or less. An average particle diameter of the plastic solid particles is a value measured in the same manner as an average particle diameter of the inorganic solid electrolyte particles described later.

In the present invention, in a case where the inorganic solid electrolyte particles are used as the plastic solid particles, the inorganic solid electrolyte particles whose plastic deformation temperature, preferably the glass transition temperature, is within the above temperature range are appropriately selected and used from inorganic solid electrolytes shown below.

-Inorganic Solid Electrolyte Particles-

The inorganic solid electrolyte particles used as the preforming material are particles of the following inorganic solid electrolyte.

In the present invention, the inorganic solid electrolyte is a solid electrolyte having inorganic properties, and the solid electrolyte refers to a solid-form electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion conductive material. In addition, the inorganic solid electrolyte is a solid in a static state, and thus, generally is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has ion conductivity of metals belonging to Group I or Group II of the periodic table and is generally a substance not having electron conductivity.

The inorganic solid electrolyte includes ion conductivity of metals belonging to Group I or Group II of the periodic table. As the inorganic solid electrolyte, it is possible to appropriately select and use solid electrolyte materials that are applied to these kinds of products. Examples of the inorganic solid electrolyte include (i) sulfide-based inorganic solid electrolytes, (ii) oxide-based inorganic solid electrolytes, (iii) halide-based inorganic solid electrolytes, and (iv) hydride-based inorganic solid electrolytes, and sulfide-based inorganic solid electrolytes are preferable, from the viewpoints of high ion conductivity and ease of interface bonding between particles, and furthermore from the viewpoint of being also used as plastic solid particles.

In a case where the all-solid state secondary battery of the present invention is an all-solid state lithium ion secondary battery, the inorganic solid electrolyte preferably has ion conductivity of lithium ions.

(i) Sulfide-Based Inorganic Solid Electrolytes

The sulfide-based inorganic solid electrolytes are preferably compounds which contain sulfur atoms, have ion conductivity of metals belonging to Group I or Group II of the periodic table, and have electron-insulating properties. The sulfide-based inorganic solid electrolytes are preferably inorganic solid electrolytes which, as elements, contain at least Li, S, and P and have lithium ion conductivity, but the sulfide-based inorganic solid electrolytes may also include elements other than Li, S, and P depending on the purposes or cases.

Examples of the sulfide-based inorganic solid electrolytes include lithium ion conductive sulfide-based inorganic solid electrolytes satisfying a composition represented by Formula (1).

$$L_{a1}M_{b1}P_{c1}S_{d1}A_{e1} \qquad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide (P2S5)), simple substance phosphorus, simple substance sulfur, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $LLi_2S$—$P_2S_{55}$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method of synthesizing sulfide-based inorganic solid electrolyte materials using the above described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably compounds which contain oxygen atoms, have ion conductivity of metals belonging to Group I or Group II of the periodic table, and have electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but realistically $1\times10^{-1}$ S/cm or less.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0<xc≤5, yc satisfies 0<yc≤1, zc satisfies 0≤zc≤1, and nc satisfies 0<nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{cc}{}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1−xf≤5, 0>yf≤3, 1≤zf≤10), $Li_{cg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

(iii) Halide-Based Inorganic Solid Electrolytes

Halide-based inorganic solid electrolytes are preferably compounds which contain halogen atoms, have ion conductivity of metals belonging to Group I or Group II of the periodic table, and have electron-insulating properties.

The halide-based inorganic solid electrolytes are not particularly limited, and examples thereof include compounds such as LiCl, LiBr, LiI, and $Li_3YBr_6$ and $Li_3YCl_6$ described in ADVANCED MATERIALS, 2018, 30, 1803075. Among these, $Li_3YBr_6$ and $Li_3YCl_6$ are preferable.

(iv) Hydride-Based Inorganic Solid Electrolytes

Hydride-based inorganic solid electrolytes are preferably compounds which contain hydrogen atoms, have ion conductivity of metals belonging to Group I or Group II of the periodic table, and have electron-insulating properties.

The hydride-based inorganic solid electrolytes are not particularly limited, and examples thereof include $LiBH_4$, $Li_4(BH_4)_3I$, $3LiBH_4$—LiCl, and the like.

The inorganic solid electrolyte used in the method of manufacturing solid electrolyte sheet of the present invention is a particle. On the other hand, the inorganic solid electrolyte used in the method of manufacturing a negative electrode sheet for an all-solid state secondary battery of the present invention and used for forming the positive electrode active material layer is preferably a particle. A particle diameter (a volume average particle diameter) of the inorganic solid electrolyte is not particularly limited, but is preferably 0.01 µm or more, and more preferably 0.1 µm or more. The upper limit is preferably 100 µm or less and more preferably 50 µm or less. An average particle diameter of the inorganic solid electrolyte particles is measured in the following order. The inorganic solid electrolyte particles are diluted and prepared to 1% by mass of a dispersion liquid by using water (in a case of a material unstable in water, heptane) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle diameter distribution measurement instrument LA-920 (trade name, manufactured by Horiba Ltd.), and a quartz cell for measurement at a temperature of 25° C., thereby obtaining a volume average particle diameter. Regarding other detailed conditions and the like, the description of JIS Z 8828:2013 "particle diameter analysis-Dynamic light scattering method" is referred to as necessary. Five specimens are produced and measured per level, and the average values thereof are employed.

The inorganic solid electrolyte may be used singly or two or more inorganic solid electrolytes may be used in combination.

-Other Components-

The preforming material may contain other components that may be contained in the solid electrolyte layer.

Examples of the other components include a binder, an additive, a dispersion medium, and the like described later.

Examples of the binder include organic polymers, and known organic polymers used of manufacturing an all-solid state secondary battery can be used without particular limitation. Examples of such organic polymers include fluorine-containing resins, hydrocarbon-based thermoplastic resins, acrylic resins, polyurethane resins, polyurea resins, polyamide resins, polyimide resins, polyester resins, polyether resins, polycarbonate resins, cellulose derivative resins, and the like. The binder may be used singly or two or more inorganic solid electrolytes may be used in combination. In a case where the preforming material contains the binder, a content of the binder in the preforming material (solid component) is not particularly limited, but is, for example, preferably 0.1% to 10% by mass, more preferably 1% to 10% by mass, and even more preferably 2% to 5% by mass.

Examples of the additives include a thickener, a crosslinking agent (such as a crosslinking agent undergoing a crosslinking reaction by radical polymerization, condensation polymerization, or ring-opening polymerization), a polymerization initiator (such as a polymerization initiator generating an acid or radical by being heated or irradiated with light), an antifoaming agent, a leveling agent, a dehydrating agent, an antioxidant, and the like.

-Preparation of Preforming Material-

In a case where the preforming material is prepared with two or more components, respective components are mixed to prepare the preforming material. For example, the preforming material is obtained by mixing plastic solid particles, inorganic solid electrolyte particles, and other components as appropriate. The mixing method is not particularly limited, and examples thereof include a method using a known mixer such as a ball mill, a bead mill, and a disc mill. In addition, mixing conditions are not particularly limited, but a mixed atmosphere is the same as the atmosphere in the preforming described later, and the preferable atmosphere is also the same.

A mixing ratio of the plastic solid particles and the inorganic solid electrolyte particles is set to an appropriate ratio in accordance with the plastic deformability of the plastic solid particles, shearing processing conditions, temperature conditions or pressurizing conditions in respective steps, and furthermore, specific applications of the all-solid state secondary battery. For example, the content of the inorganic solid electrolyte in the preforming material is not particularly limited, and when considering a reduction of interface resistance when the all-solid state secondary battery is used and maintenance of the reduced interface resistance, the content is preferably 5% by mass or more, more preferably 10% by mass or more, and particularly preferably 15% by mass or more, with respect to 100% by mass of a solid component. A content of the plastic solid particles in the preforming material is not particularly limited, and is preferably 1% to 90% by mass and more preferably 5% to 80% by mass, with respect to 100% by mass of a solid component. A total content of the inorganic solid electrolyte particles and the plastic solid particles in the preforming material is 100% by mass or less, preferably 80% to 100% by mass, and more preferably 90% to 100% by mass, with respect to 100% by mass of a solid component.

In the present invention, the term "solid component (solid content)" refers to a component which does not disappear by volatilization or evaporation in a case where the preforming material is dried at 130° C. for 6 hours under an atmospheric pressure of 1 mmHg and a nitrogen atmosphere. Typically, the solid component refers to components other than a dispersion medium described later.

A content of other components in the preforming material is not particularly limited and is set appropriately.

-Preforming of Preforming Material-

In the step A, the prepared preforming material is subjected to preforming generally into a layer shape or a film shape.

A forming method in the step A may be any method capable of forming the preforming material into a predetermined shape, various known forming methods can be applied, and press forming (for example, press forming using a hydraulic cylinder press machine) is preferable. A pressurizing force during forming is not particularly limited, but is generally preferably set in a range of 50 to 1500 MPa, and more preferably set in a range of 100 to 300 MPa. In a case where the step C described later is performed, the pressurizing force in the step A is even more preferably set lower than the pressurizing force in the main forming of the step C within the above range.

The forming material may be heated to the same time as a pressurization of the preforming, but in the present invention, the preforming is preferably performed without heating, and for example, the preforming is preferably performed at an environmental temperature of 10° C. to 50° C. In addition, in a case of heating the forming material, it is preferable to set the condition to have the glass transition temperature or lower in order to avoid excessive plastic deformation of plastic solid particles which causes an occurrence of cracks.

The atmosphere during preforming is not particularly limited, and may be in any environment such as in the atmosphere, under the dried air (the dew point: −20° C. or lower), in an inert gas (for example, in an argon gas, in a helium gas, or in a nitrogen gas). Since the inorganic solid electrolyte reacts with moisture, the atmosphere during preforming is preferably under dried air or in an inert gas.

The preforming (pressing) time may be short (for example, within several hours) or long (for one day or more).

In this step, the above described base material or electrode collector, which supports the preforming material, can also be used.

By carrying out the step A in this way, a preformed body of the inorganic solid electrolyte particles containing the plastic solid particles is obtained.

(Step B: Shearing Processing Step)

In the method of manufacturing a solid electrolyte sheet of the present invention, one surface (a surface on which the plastic solid particles exist) of the obtained preformed body is then subjected to shearing processing.

In the present invention, "the surface on which the plastic solid particles exist is subjected to shearing processing" means processing in which a shearing force is applied to the surface of the preformed body, and this surface is prepared as a surface which can block growth of dendrites and on which cracks and fissures hardly occur. The shearing processing is different from polishing processing for simply smoothing a surface (on which plastic solid particles do not exist) of a sintered body of an oxide-based inorganic solid electrolyte, from the viewpoint of preparing a surface on which plastic solid particles exist is prepared as the above described surface.

In the shearing processing, the shearing force applied to the surface of the preformed body can be represented by the minimum shearing energy acting (transmitted) on the surface (per unit area) of the preformed body. In addition, the shearing force is appropriately set in accordance with the plastic deformability of the plastic solid particles, the mixing ratio of plastic solid particles (furthermore, a ratio of plastic solid particles existing on the surface), or the like, and is not uniquely determined. In a case where a surface brushing method described later is employed as the shearing processing, the minimum shearing energy per unit area is defined by brush rotation speed×processing time×friction force. The minimum shearing energy per unit area can be set to, for example, 100 (gf/mm$^2$)·mm (1000 Pa·m) or more. The brush rotation speed, the processing time, and the friction force are also appropriately set, and for example, the brush rotation speed is 100 to 15000 rpm, and the processing time is 0.01 to 30 minutes. More specifically, examples of conditions applied in Examples are described later.

A method of shearing processing is not particularly limited as long as the surface of the preformed body can be prepared as the above described specific surface, and examples thereof include a surface brushing method (using a metal brush harder than plastic solid particles), a method of rubbing a surface with a metal blade and the like can be mentioned, and the like, and from the viewpoint of productivity and production cost, a surface brushing method is preferable.

A direction in which the shearing force is applied to the surface of the preformed body is not particularly limited as long as the direction is a direction parallel to the surface, may be a direction along one direction, and examples thereof include a direction along a plurality of directions, a direction along a circumferential direction, a direction in which the above directions are combined, or the like.

An atmosphere during the shearing processing is the same as an atmosphere during the preforming, and a preferable atmosphere is also the same.

The step B is preferably performed such that the preformed body is heated to a temperature higher than the glass transition temperature of the plastic solid particles, that is, a temperature of the preformed body is set to a temperature higher than the glass transition temperature of the solid particles. Advantages of performing the shearing processing under such heating are as described above. The heating temperature that is preferably set to the preformed body in the step B may be a temperature of 5° C. or more higher than the glass transition temperature (Tg) (Tg+a temperature of 5° C. or higher) of the plastic solid particles is preferable, and a temperature of 10° C. to 150° C. higher than the glass transition temperature is more preferable. The upper limit of the heating temperature is not particularly limited, and for example, can be 250° C. The heating temperature is preferably equal to or higher than a temperature at which the plastic solid particles are plastically deformed from the viewpoint of causing the plastically deformable particles to be plastically deformed effectively.

The step B is executed in this way, whereby a preformed body whose surface is subjected to the shearing processing (dendrite penetration inhibiting surface) is obtained.

In the method of manufacturing a solid electrolyte sheet of the present invention, the following step C is preferably performed after the step B (the step A, step B, and step C are performed in sequence).

(Step C: Main Forming Step)

Step C is a step of applying a vertical pressure to the preformed body obtained in the step B to perform main forming. The solid electrolyte layer in which the voids on the surface are further reduced can be formed through the step C without the occurrence of defects such as cracks and fissures on the dendrite penetration inhibiting surface formed in the step B.

A main forming method may be a forming method of applying a vertical pressure onto the preformed body, and for example, press forming mentioned as a preforming method is preferable. In this main forming step (particularly, press forming), the same forming method as the preforming method (press forming) in the step A can be employed, except that the pressurizing force is set high without heating. Temperature conditions in the main forming step may be a temperature in a state of the preformed body without heating, and for example, can be set to an environmental temperature of 0° C. to 50° C. A pressurizing force in the main forming step is preferably set higher than the pressurizing force in the preforming step, and generally, the pressurizing force is more preferably set in a range of 100 to 1000 MPa, and even more preferably set in a range of 150 to 600 MPa. A pressure difference between the pressurizing force in the preforming step and the pressurizing force in the main forming step is not particularly limited, but for example, 10 to 1000 MPa is preferable, and 100 to 400 MPa is more preferable. A pressing direction is a direction perpendicular to the surface to be pressed of the preformed body (a vertical pressure), and is generally the same as a pressing direction in the step A.

The step A, step B, and preferably step C are executed in this manner in sequence, the solid electrolyte sheet including the solid electrolyte layer having the shearing processed surface is obtained. This solid electrolyte layer is the same as the solid electrolyte layer of the all-solid state secondary battery.

(Step D: Metal Film Forming Step)

In a case where the solid electrolyte sheet includes the above described metal film, a step of providing (disposing) the metal film on the shearing processed surface of the solid electrolyte layer. The method of forming the metal film is not particularly limited, and examples thereof include a sputtering method, a vapor deposition method, an ion plating method, and the like. Conditions of the forming method are not particularly limited, and appropriate conditions are selected depending on metal kinds, thickness, and the like. A method of providing the metal film on the shearing processed surface is not particularly limited, and examples thereof include a method of forming a metal film on a shearing processed surface by the above forming method, a method of laminating (placing) a metal film produced in advance by the above forming method on a shearing processed surface, and furthermore, a method of transferring (pressure-bonding and laminating) a metal film produced in advance by the above forming method on a shearing processed surface. As a method of laminating or transferring the metal film produced in advance on the shearing processed surface and conditions, for example, a method of placing a negative electrode active material on a shearing processed surface, and furthermore, performing pressing and conditions, which are described later, can be selected.

In a case of having an electrode collector and the like, a method of providing the electrode collector is not particularly limited, and a method of placing the electrode collector and the like on a shearing processed surface and then performing pressing and conditions, which are described later, can be selected.

The step A, step B, and preferably the step C and step D are executed in this manner, whereby the solid electrolyte layer having the shearing processed surface, preferably the solid electrolyte sheet further including a metal film, can be obtained. These solid electrolyte layer and metal film are the same as the solid electrolyte layer and the metal film of the all-solid state secondary battery.

As described above, the solid electrolyte sheet of the present invention can be manufactured.

<Method of Manufacturing Negative Electrode Sheet for All-Solid State Secondary Battery>

The method of manufacturing a negative electrode sheet for an all-solid state secondary battery is executed according to a form of the negative electrode of the all-solid state secondary battery. That is, in a case of manufacturing an all-solid state secondary battery in a form in which a negative electrode active material layer is formed in advance (in a case where a negative electrode active material layer is formed in a layer forming step in manufacturing of a battery), a negative electrode sheet for an all-solid state secondary battery is manufactured. On the other hand, in a case of manufacturing an all-solid state secondary battery in a form in which a negative electrode active material layer is not formed in advance (in a case where a negative electrode active material layer is not formed in the layer forming step in the manufacturing of a battery), there is no need to manufacture a negative electrode sheet for an all-solid state secondary battery.

In the method of manufacturing a negative electrode sheet for an all-solid state secondary battery of the present invention, a step of pressure-bonding and laminating the negative electrode active material on the surface of the solid electrolyte layer, which is subjected to the shearing processing in the solid electrolyte sheet obtained by the method of manufacturing a solid electrolyte sheet of the present invention. Thereby, the negative electrode active material layer can be formed on a specific surface of the solid electrolyte layer.

The method of pressure-bonding and laminating the negative electrode active material is not particularly limited, and examples thereof include a method of placing (disposing) the negative electrode active material on a shearing processed surface of the solid electrolyte layer, and then performing pressing.

The negative electrode active material to be used may be particles of the following negative electrode active material, or may be a formed body consisting of the particles. In addition, the formed body consisting of the negative electrode active material can be produced using the particles of the negative electrode active material by a known method (a method of applying and drying a slurry containing a negative electrode active material, or a method of performing press forming particles of a negative electrode active material). The negative electrode active material can also be used as other components described as examples of inorganic solid electrolytes, preferably a lithium salt, a conductive auxiliary agent, and furthermore a preformed body, and a negative electrode composition mixed with a dispersion medium. The inorganic solid electrolytes, the lithium salt, the conductive auxiliary agent, the dispersion medium, and the like used for the all-solid state secondary battery can be used without particular limitation.

In the present invention, it is preferable to use the above described lithium metal layer (a lithium foil, a lithium vapor deposition film, and the like) as the negative electrode active material. This lithium metal layer can also be used as a laminate formed with a negative electrode collector.

-Negative Electrode Active Material-

The negative electrode active material used in the present invention is a material capable of inserting and releasing ions of a metal element belonging to Group I or Group II of the periodic table. The negative electrode active material capable of reversibly inserting and releasing lithium ions is preferred. The materials thereof are not particularly limited as long as materials have the above described characteristics, and examples thereof include a carbon material, an oxide of a metal or metalloid element (including a complex oxide), elemental lithium, lithium alloy, a negative electrode active material that can be formed to an alloy with lithium (forming an alloy with lithium), or the like. Among these, from the viewpoint of reliability, a carbon material, an oxide of a metalloid element, a metal complex oxide, and elemental lithium are preferable. A negative electrode active material capable of forming an alloy with lithium is preferable from the viewpoint that a capacity of the all-solid state secondary battery can be increased.

A carbon material used as the negative electrode active material is a material substantially consisting of carbon. Examples thereof include petroleum pitch, carbon black such as acetylene black (AB), graphite (natural graphite and artificial graphite such as vapor-grown graphite), and carbon materials obtained by firing various synthetic resins such as a polyacrylonitrile(PAN)-based resin or a furfuryl alcohol resin. Furthermore, examples thereof also include various carbon fibers such as PAN-based carbon fiber, cellulose-based carbon fiber, pitch-based carbon fiber, vapor-grown carbon fiber, dehydrated polyvinyl alcohol (PVA)-based carbon fiber, lignin carbon fiber, glassy carbon fiber, and activated carbon fiber, mesophase microspheres, graphite whiskers, flat graphite, and the like.

These carbon materials can be classified into non-graphitizable carbon materials (also referred to as hard carbon) and graphite-based carbon materials according to the degree of graphitization. In addition, the carbon materials preferably have a surface spacing or density, and a crystallite size described in JP1987-022066A (JP-S62-022066A), JP1990-006856A (JP-H2-006856A), and JP1991-045473A (JP-H3-045473A). The carbon materials may not be a single material, but a mixture of natural graphite and artificial graphite described in JP1993-090844A (JP-H5-090844A), graphite having a coating layer described in JP1994-004516A (JP-H6-004516A), or the like may be used.

As the carbon materials, hard carbon or graphite is preferably used, and graphite is more preferably used.

The oxide of the metal or metalloid element applied as the negative electrode active material is not particularly limited as long as the oxide is an oxide capable of occluding and releasing lithium, and examples thereof include an oxide of a metal element (metal oxide), a complex oxide of a metal element or a complex oxide of a metal element and a metalloid element (collectively referred to as a metal complex oxide), and an oxide of a metalloid element (a metalloid oxide). As these oxides, amorphous oxides are preferable, and furthermore chalcogenide that is a reaction product of a metal element and an element belonging to Group XVI of the periodic table is also preferable. In the present invention, the term "metalloid element" refers to an element having an intermediate property between a metal element and a non-metalloid element, and generally includes six elements of boron, silicon, germanium, arsenic, antimony, and tellurium, and further includes three elements of selenium, polonium, and astatine. In addition, the term "amorphous" refers to oxides having a broad scattering band having a peak of a 2θ value in a range of 20° to 40° in an X-ray diffraction method in which CuKα rays are used and may have crystalline diffraction lines. The maximum intensity in the crystalline diffraction line appearing at the 2θ value of 40° to 70° is preferably 100 times or less and more preferably five times or less of the diffraction line intensity at the peak of the broad scattering band appearing at the 2θ value of 20° to 40°, and particularly preferably does not have any crystalline diffraction lines.

In a compound group consisting of the amorphous oxides and the chalcogenides, amorphous oxides of metalloid elements or chalcogenides are more preferable, and (complex) oxides consisting of one element or a combination of two or more elements selected from elements belonging to Groups XIII (IIIB) to XV (VB) of the periodic table (for example, Al, Ga, Si, Sn, Ge, Pb, Sb, and Bi) or chalcogenides are particularly preferable. Specific examples of preferable amorphous oxides and chalcogenides preferably include $Ga_2O_3$, $GeO$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $GeS$, $PbS$, $PbS_2$, $Sb_2S_3$, or $Sb_2S_5$.

Examples of the negative electrode active material that can be used in combination with an amorphous oxide negative electrode active material mainly using Sn, Si, and Ge suitably include a carbon material that can occlude and/or release lithium ion or lithium metal, elemental lithium, lithium alloy, and a negative electrode active material that can be formed to an alloy with lithium.

Oxides of metals or metalloid elements, particularly metal (complex) oxides and the above described chalcogenide, preferably contain at least one of titanium or lithium as a component from the viewpoint of high current density charging and discharging characteristics. Examples of lithium-containing metal complex oxides (lithium metal complex oxide) include complex oxides of lithium oxide and the metal (complex) oxide or chalcogenide, more specifically, $Li_2SnO_2$.

A negative electrode active material, for example, a metal oxide preferably contains a titanium atom (titanium oxide). Specifically, $Li_4Ti_5O_{12}$ (lithium titanium oxide [LTO]) is preferred since the volume fluctuation during occlusion and release of lithium ions is small, and thus the high-speed charging and discharging characteristics are excellent, and deterioration of electrodes is suppressed, whereby the service lives of lithium ion secondary batteries can be improved.

The lithium alloy as the negative electrode active material is not particularly limited as long as the lithium alloy is an alloy generally used as a negative electrode active material of a secondary battery, and examples thereof include a lithium aluminum alloy.

The negative electrode active material capable of forming an alloy with lithium is not particularly limited as long as the negative electrode active material is generally used as a negative electrode active material of a secondary battery. Such an active material has a large expansion and contraction due to charging and discharging. Examples of such an active material include negative electrode active materials having a silicon atom or a tin atom, and respective metals such as Al, In, and the like. Negative electrode active materials having a silicon atom that achieves a higher battery capacity (silicon atom-containing active materials) are preferable, and silicon atom-containing active materials having a silicon atom content of 50 mol % or higher of all constituent atoms are more preferable.

Generally, negative electrodes containing these negative electrode active materials (Si negative electrodes containing a silicon atom-containing active materials, Sn negative electrodes containing tin atom-containing active materials, and the like) can occlude more lager Li ions than carbon negative electrodes (such as graphite and acetylene black). That is, the amount of occluded Li ions per unit mass increases. Therefore, the battery capacity can be increased. As a result, there is an advantage that the battery driving time can be extended.

Examples of the silicon atom-containing active materials include silicon materials such as Si and SiOx (0<x≤1), and furthermore, silicon-containing alloys containing titanium, vanadium, chromium, manganese, nickel, copper, lanthanum and the like (for example, $LaSi_2$, $VSi_2$, La—Si, Gd—Si, Ni—Si), or organized active materials (for example, $LaSi_2/Si$), and other examples include active materials containing silicon atoms and tin atoms such as $SnSiO_3$, $SnSiS_3$, and the like. Since SiOx itself can be used as a negative electrode active material (metalloid oxide) and generates Si by operation of an all-solid state secondary battery, SiOx can be used as a negative electrode active material capable of forming an alloy with lithium (a precursor material).

Examples of the negative electrode active materials having a tin atom include Sn, SnO, $SnO_2$, SnS, $SnS_2$, furthermore active materials containing the above silicon atom and tin atom, and the like. Furthermore, examples thereof may also include a complex oxide with lithium oxide, for example, $Li_2SnO_2$.

A shape of the negative electrode active material is not particularly limited, but is preferably particulate. A particle diameter (volume average particle diameter) of the negative electrode active material is preferably 0.1 to 60 μm. In order to provide a predetermined particle diameter to the negative electrode active material, an ordinary crusher or classifier may be used. For example, a mortar, a ball mill, a sand mill, an oscillatory ball mill, a satellite ball mill, a planetary ball mill, a swirling airflow-type jet mill, a sieve, or the like is suitably used. During crushing, it is also possible to carry out wet-type crushing in which water or an organic solvent such as methanol is made to coexist. In order to provide a desired particle diameter, classification is preferably carried out. A classification method is not particularly limited, and it is possible to use a sieve, a wind power classifier, or the like. Both of dry-type classification and wet-type classification can be carried out. An average particle diameter of the negative electrode active material particles can be measured by the same method as the above described method of measuring the volume average particle diameter of the inorganic solid electrolytes.

In the present invention, the chemical formulae of compounds obtained using the firing method can be calculated using an inductively coupled plasma (ICP) emission spectroscopic analysis method as a measurement method or, as a convenient method, from the mass difference of powder before and after firing.

The surface of the negative electrode active material may be coated with a separate metal oxide.

The negative electrode active material may be used singly or two or more negative electrode active materials may be used in combination.

In a case where the negative electrode active material layer is formed, the mass (mg) (basis weight) of the negative electrode active material per unit area ($cm^2$) of the negative electrode active material layer is not particularly limited. The mass can be determined appropriately according to the designed battery capacity.

The content of the negative electrode active material in the negative electrode composition is not particularly limited, and is preferably 100% by mass or less, more preferably 10% to 80% by mass, and even more preferably 20% to 80% by mass, with respect to 100% by mass of a solid component.

In a case where the negative electrode composition contains an inorganic solid electrolyte, a total content of the inorganic solid electrolyte and the negative electrode active material in the negative electrode composition is preferably 5% by mass or more, more preferably 10% by mass or more, even more preferably 15% by mass or more, still even more preferably 50% by mass or more, particularly preferably 70% by mass or more, and most preferably 90% by mass or more, with respect to 100% by mass of a solid component. The upper limit is preferably 99.9% by mass or less, more preferably 99.5% by mass or less, and particularly preferably 99% by mass or less.

A content of other components in the negative electrode composition is not particularly limited and is appropriately set, and can be the above content described in, for example, the preforming material.

-Pressure-Bond and Lamination-

The negative electrode active material (negative electrode composition) is placed on the shearing processed surface of the solid electrolyte layer, and is pressure-bonded and laminated. Thereby, even though dendrites are precipitated on the negative electrode (negative electrode active material layer), the shearing processed surface can block the growth of the dendrites reaching the positive electrode.

A pressure during the pressure-bond and lamination may be any pressure as long as the negative electrode active material can be pressure-bonded and laminated, and can be set to, for example, 1 MPa or more, preferably 1 to 60 MPa, and more preferably 5 to 30 MPa. The pressure-bond and lamination may be performed under heating, but in the present invention, it is preferable that the pressure-bond and lamination is performed without heating, and for example, preferably performed at an environmental temperature of 0° C. to 50° C. An atmosphere in which the pressure-bond and lamination is performed is the same as the atmosphere during the preforming in the step A.

By executing the pressure-bonding and laminating step in this manner, the negative electrode sheet for an all-solid state secondary battery that is provided with the solid electrolyte layer and the negative electrode active material layer laminated on the shearing processed surface of this solid electrolyte layer can be produced.

<Method of Manufacturing All-Solid State Secondary Battery According to Embodiment of the Present Invention>

In the method of manufacturing an all-solid state secondary battery according to the embodiment of the present invention, the all-solid state secondary battery is manufactured through different steps depending on a form of the negative electrode of the all-solid state secondary battery to be manufactured. That is, in a case of manufacturing an all-solid state secondary battery in a form in which a negative electrode active material layer is formed in advance, the all-solid state secondary battery is manufactured through the manufacture of a negative electrode sheet for an all-solid state secondary battery described above. On the other hand, in a case of manufacturing an all-solid state secondary battery in a form in which a negative electrode active material layer is not formed in advance, the all-solid state secondary battery is manufactured using the solid electrolyte sheet described above.

(Method of Manufacturing All-Solid State Secondary Battery in Form in Which Negative Electrode Active Material Layer is Formed in Advance)

In a case of manufacturing the all-solid state secondary battery in a form in which the negative electrode active material layer is formed in advance, a positive electrode active material layer is formed on a surface of the negative electrode sheet for an all-solid state secondary battery obtained by the method of manufacturing the negative electrode sheet for an all-solid state secondary battery of the present invention, the surface being opposite to the negative electrode active material layer.

The positive electrode active material for forming the positive electrode active material layer may be particles of the positive electrode active material, or may be used as a formed body consisting of the particles. This formed body can be produced in the same manner as a formed body consisting of the negative electrode active material. The positive electrode active material can also be used as other components described as examples of inorganic solid electrolytes, furthermore a lithium salt, a conductive auxiliary agent, and a preformed body, and a positive electrode composition mixed with a dispersion medium. This positive electrode composition may contain a negative electrode active material precursor described later. The inorganic solid electrolytes, the lithium salt, the conductive auxiliary agent, the dispersion medium, and the like used for the all-solid state secondary battery can be used without particular limitation.

-Positive Electrode Active Material-

The positive electrode active material used in the present invention is a material capable of inserting and releasing ions of a metal element belonging to Group I or Group II of the periodic table. A metal oxide (preferably a transition metal oxide) is preferably used as the positive electrode active material.

The positive electrode active material capable of reversibly inserting and releasing lithium ions is preferred. The materials thereof are not particularly limited as long as the materials have the above described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobaltate [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_7MnPO_4F$, cobalt fluorophosphates such as $Li_2CoPO_4F$. Examples of the lithium-containing transition metal silicate compounds (ME) include $Li_2FeSiO_4$, $Li_2MnSiO_4$, $Li_2CoSiO_4$, and the like.

In the present invention, a transition metal oxide having a (MA) bedded salt-type structure is preferred, and LCO or NMC is more preferred.

A shape of the positive electrode active material is not particularly limited, but is preferably particulate. A volume average particle diameter (an average particle diameter in terms of sphere) of the positive electrode active material is not particularly limited. For example, the volume average particle diameter can be 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. An average particle diameter of the positive electrode active material particles can be measured by the same method as the above described method of measuring the volume average particle diameter of the inorganic solid electrolytes.

The surface of the above described positive electrode active material may be coated with a separate metal oxide.

The negative electrode active material may be used singly or two or more negative electrode active materials may be used in combination.

In a case where the positive electrode active material layer is formed, the mass (mg) (basis weight) of the positive electrode active material per unit area ($cm^2$) of the positive electrode active material layer is not particularly limited. The mass can be determined appropriately according to the designed battery capacity.

The content of the positive electrode active material in the positive electrode composition is not particularly limited, and is preferably 10% to 95% by mass, more preferably 30% to 90% by mass, even more preferably 50% to 85% by mass, and particularly preferably 55% to 80% by mass, with respect to 100% by mass of a solid component.

In a case where the positive electrode composition contains an inorganic solid electrolyte, a total content of the inorganic solid electrolyte and the positive electrode active material in the positive electrode composition is preferably 5% by mass or more, more preferably 10% by mass or more, even more preferably 15% by mass or more, still even more preferably 50% by mass or more, particularly preferably 70% by mass or more, and most preferably 90% by mass or more, with respect to 100% by mass of a solid component. The upper limit is preferably 99.9% by mass or less, more preferably 99.5% by mass or less, and particularly preferably 99% by mass or less.

A content of other components in the positive electrode composition is not particularly limited and is appropriately set, and can be the above content described in, for example, the preforming material.

-Formation of Positive Electrode Active Material Layer-

The method of forming the positive electrode active material layer is not particularly limited, and a general method can be applied. Examples thereof include a method of placing the following positive electrode active material on a surface opposite to a negative electrode active material layer, a method of placing (adhering) a formed body (sheet) obtained by forming the following positive electrode active material in a layer shape on a surface opposite to a negative electrode active material layer, a method of applying and drying a positive electrode composition containing the following positive electrode active material on a surface opposite to a negative electrode active material layer, and the like. The positive electrode active material can also be placed and then can be pressure-bonded and laminated, and examples of the pressure-bonding and laminating method include a pressure-bonding and laminating method in the negative electrode active material layer. Examples of the method of applying and drying the positive electrode composition include a method of heating the positive electrode composition applied by a known application method at an appropriately set temperature.

In this manner, a laminate consisting of the negative electrode active material layer, the solid electrolyte layer, and the positive electrode active material layer is obtained. In a case of using the above described positive electrode sheet for an all-solid state secondary battery as the solid electrolyte sheet, the above described negative electrode active material layer is formed to obtain a laminate consisting of the above three layers.

In particular, in a case where the above Si negative electrode is employed as the negative electrode active material layer, the positive electrode active material layer is preferably formed by using a positive electrode composition containing a positive electrode active material and a negative electrode active material precursor, which is described in the following <Method of manufacturing all-solid state secondary battery in form in which the negative electrode active material layer is not formed in advance>. A silicon material or a silicon-containing alloy has a large irreversible capacity, and generally has a problem of a large reduction in a capacity (an amount of movable lithium ions) due to the first charge. However, metal ions that have been reduced are replenished (doped) (metal ions are occluded in the Si negative electrode) by forming the positive electrode active material layer of the all-solid state secondary battery provided with the Si negative electrode with the positive electrode composition containing the negative electrode active material precursor, whereby the above problems peculiar to the Si negative electrode can be suppressed.

Furthermore, when the positive electrode active material layer contains a negative electrode active material precursor, expansion due to occlusion of metal ions during charging or expansion due to metal precipitation causes voids generated by decomposition reaction of the negative electrode active material precursor in the positive electrode active material layer. Therefore, the solid electrolyte layer can be prevented from being destroyed, and the dendrites reaching the positive electrode can be more effectively suppressed. Furthermore, in a preferable form in which the voids are collapsed as described later, the energy density can be improved.

The method of forming the positive electrode composition containing the negative electrode active material precursor and the positive electrode active material layer will be described later.

In this form of the method of manufacturing an all-solid state secondary battery, in a case where the positive electrode active material layer is formed by using the positive electrode composition containing the positive electrode active material and the negative electrode active material precursor, the charged positive electrode active material layer is preferably pressurized and compressed. The voids formed in the positive electrode active material layer after charging are collapsed (crushed) by this pressurization and compression, and the positive electrode active material layer is thinned (densified). As a result, a total thickness (volume) of the all-solid state secondary battery is decreased, and an energy density is improved.

Details of a step of charging the positive electrode active material layer and a pressurizing step will be described in the following <Method of manufacturing all-solid state secondary battery in form in which negative electrode active material layer is not formed in advance>.

It is possible to manufacture an all-solid state secondary battery (before initialization) having a form in which the negative electrode active material layer is formed in advance by providing necessary members to the laminate manufactured in this manner.

(Method of Manufacturing All-Solid State Secondary Battery in Form in Which Negative Electrode Active Material Layer is Not Formed in Advance)

-Step of Forming Positive Electrode Active Material Layer-

In a case of manufacturing the all-solid state secondary battery having a form in which the negative electrode active material layer is not formed in advance, the positive electrode active material layer is formed on a surface opposite to the shearing processed surface of the solid electrolyte sheet obtained by the method of manufacturing a solid electrolyte sheet of the present invention.

In the method of manufacturing an all-solid state secondary battery in the form in which a negative electrode active material layer is not formed in advance, a method of forming the positive electrode active material layer is the same as the method of manufacturing an all-solid state secondary battery in the form in which a negative electrode active material layer is formed in advance.

In this form, a form in which the positive electrode composition for forming the positive electrode active material layer contains the positive electrode active material and the negative electrode active material precursor is also preferable. This positive electrode composition may preferably contain inorganic solid electrolytes, and furthermore, may contain a lithium salt, a conductive auxiliary agent, the above described other components, a dispersion medium, and the like.

The negative electrode active material precursor is a compound that generates (releases) ions of a metal element (metal ions) belonging to Group I or Group II of the periodic table in the positive electrode active material layer, by the charging step described later. The generated metal ions reach the negative electrode collector and the like by charging the all-solid state secondary battery and pre-dope the negative electrode active material layer. In a case where the all-solid state secondary battery has the form in which a negative electrode active material layer is not formed in advance, metal ions reach the negative electrode collector and are coupled with electrons to be precipitated as a metal so as to pre-dope the negative electrode active material layer.

The negative electrode active material precursor is not particularly limited as long as the negative electrode active material precursor has such characteristics or functions, and examples thereof include compounds containing the above metal element. However, there is a difference from a lithium salt as a supporting electrolyte used as a material for an all-solid state secondary battery in that the negative electrode active material precursor releases and decomposes lithium ions during the first charge, and does not contribute to the release of lithium ions during the next charge.

The negative electrode active material precursor is preferably an inorganic compound containing the above metal element, more preferably an inorganic salt that generates the above metal ions and anions, even more preferably a carbonate, oxide, or hydroxide of the above metal element (alkali metal or alkaline earth metal), and particularly preferably a compound selected from a carbonate. The inorganic salt is not particularly limited, but it is preferable that the inorganic salt is decomposed to generate a gas at room temperature and normal pressure, and preferably in a charging environment. For example, the carbonate is decomposed to generate metal element ions and carbonate ions. The generated metal element ions serve as a constituent material of the negative electrode active material layer, and carbonate ions are converted into carbon dioxide gas and released and disappeared from the positive electrode active material layer to the outside. Therefore, the carbonate, including decomposition products thereof, does not remain in the positive electrode active material layer, and deterioration of battery characteristics (energy density) due to inclusion of the carbonate can be avoided.

In a case where the all-solid state secondary battery is an all-solid state lithium ion secondary battery, the metal element forming the negative electrode active material precursor is preferably lithium.

Examples of the negative electrode active material precursor include carbonates, oxides, hydroxides, halides, and carboxylates (for example, oxalates) of the above metal elements. More specifically, examples of the lithium salt include lithium carbonate, lithium oxide, lithium hydroxide, lithium fluoride, lithium chloride, lithium oxalate, lithium iodide, lithium nitride, lithium sulfide, lithium phosphide, lithium nitrate, lithium sulfate, lithium phosphate, lithium oxalate, lithium formate, lithium acetate, and the like. Among these, lithium carbonate, lithium oxide, or lithium hydroxide is preferable, and lithium carbonate is more preferable from the viewpoint that the lithium carbonate is safely handled in air (low hygroscopicity).

This positive electrode composition may contain one kind or two or more kinds of negative electrode active material precursors described later.

An average particle diameter of the negative electrode active material precursors is not particularly limited, but is preferably 0.01 to 10 µm, and more preferably 0.1 to 1 µm. The average particle diameter is a value measured in the same manner as an average particle diameter of the inorganic solid electrolyte particles described above.

A content of the negative electrode active material precursor in the positive electrode composition is not uniquely determined since the content varies due to the amount of the replenished metal element ions, or the like, and for example, 0% to 50% by mass or less is preferable, 5% to 30% by mass is more preferable, and 7% to 20% by mass is even more preferable, with respect to 100% by mass of a solid component.

In a case where the positive electrode composition contains the negative electrode active material precursor, a total content of the positive electrode active material and the negative electrode active material precursor in the positive electrode composition can be set to the same content as the positive electrode active material in the positive electrode composition containing no negative electrode active material precursor, and the total content is preferably 70% to 90% by mass.

In a case of using the negative electrode active material precursor, it is possible to replenish (dope) the metal element ions without using a highly active material (for example, Li metal) during the manufacturing of the all-solid state secondary battery, and thereby improvement of the battery capacity can be expected. In the form in which the negative electrode active material layer is not formed in advance, a reduction in an amount of lithium is large due to the first charge in the same as the Si negative electrode; however, it possible to replenish lithium by using the negative electrode active material precursor.

In particular, the carbonate generates metal element ions and carbonate ions by oxidative decomposition and disappears. The generated metal element ions serve as a constituent material of the negative electrode active material layer, and carbonate ions are converted into carbon dioxide gas and released to the outside of the layer. Therefore, the carbonate, including decomposition products thereof, does not remain in the positive electrode active material layer, and deterioration of battery characteristics due to inclusion of the carbonate can be avoided (energy density is improved). Furthermore, in a preferable form in which the voids generated by a decomposition reaction of the carbonate are collapsed, the energy density can be further improved.

In the present manufacturing method, the negative electrode collector may be laminated on the shearing processed surface or metal film of the solid electrolyte sheet. A laminating method and conditions at this time are not particularly limited, but, for example, the "pressure-bonding and laminating" method and the conditions thereof in the above described <Method of manufacturing negative electrode sheet for all-solid state secondary battery> can be applied.

As described above, it is possible to manufacture a laminate (an all-solid state secondary battery precursor) consisting of the positive electrode active material layer and the solid electrolyte layer, as well as the metal film, the negative electrode collector, and the like.

In a case of using the above described positive electrode sheet for an all-solid state secondary battery as the solid electrolyte sheet, this positive electrode sheet for an all-solid state secondary battery is used as it is for the method of manufacturing an all-solid state secondary battery in the form in which the negative electrode active material layer is not formed in advance.

-Laminate Charging Step-

In the present manufacturing method, the obtained laminate is charged (after an appropriate member is provided). By performing this charging step, an alkali metal and an alkaline earth metal can be precipitated on the surface of the negative electrode collector to form the negative electrode active material layer (to manufacture the all-solid state secondary battery having the negative electrode active material layer formed therein). In particular, in a case where the positive electrode active material layer is formed of the positive electrode composition containing the negative electrode active material precursor, the negative electrode active material can be replenished by charging as described above.

The method of charging a laminate is not particularly limited, and known methods can be used. The charging conditions may be any conditions as long as the negative electrode active material precursor in the positive electrode active material layer can be oxidatively decomposed, and examples thereof include the following conditions.

Current: 0.05 to 1 mA/cm$^2$
Voltage: 4.2 to 4.5V
Charging time: 1 to 20 hours
Temperature: 25° C. to 60° C.

In a case of using the negative electrode active material precursor, the charging step is preferably performed under releasing the laminate without sealing the laminate in order to release anions (compounds generated from the anions) of the negative electrode active material precursor to the outside of the laminate. The atmosphere at this time is the same as the atmosphere during preforming.

In the above described charging step, charging may be performed once or plural times.

The above described charging can also be performed by initialization that is preferably performed after manufacturing or before using the all-solid state secondary battery.

The charging step can also be performed in a state where the entire laminate is restrained and pressurized in the laminating direction. A restraining and pressurizing pressure during the restraint of the entire laminate can be set in the same range as the restraining and pressurizing pressure described later in a case of restraining and pressurizing the laminate or the all-solid state secondary battery. In a case where the restraining and pressurizing pressure is within the above range, an alkali metal or an alkaline earth metal is precipitated on the negative electrode collector well, and is easily dissolved during discharging, so that excellent battery performance is achieved (discharge deterioration is unlikely to occur). In addition, a short-circuit due to dendrites can be effectively prevented.

The negative electrode active material precursor in the positive electrode active material layer is oxidatively decomposed by this charging step, and metal ions and anions are generated. The generated metal ions migrate to the negative electrode active material layer or the vicinity thereof to dope the negative electrode active material layer. On the other hand, the anions may remain in the positive electrode active material layer, and preferably, the anions are converted into a gas and are released to the outside of the laminate. As described above, in the manufacturing method of the present invention, safe and simple pre-doping can be performed without using lithium metal or the like.

In this manner, in a case where charging is completed, the negative electrode active material layer is formed. In a case of using the negative electrode active material precursor, voids derived from the negative electrode active material precursor that is oxidatively decomposed are generated in the positive electrode active material layer. Since a void volume in the positive electrode active material layer after charging (a total void volume including the voids derived from the negative electrode active material precursor) varies in accordance with a kind or particle diameter of the positive electrode active material, conditions for forming the positive electrode active material layer, and a kind, particle diameter, content, or the like of the negative electrode active material precursor, the void volume is not uniquely determined, and can be, for example, 5% to 30%, and preferably 15% to 25%.

-Positive Electrode Active Material Layer Pressurizing Step-

In the method of manufacturing an all-solid state secondary battery according to the embodiment of the present invention, the positive electrode active material layer formed using the positive electrode composition containing the positive electrode active material and the negative electrode active material precursor is preferably pressurized and compressed after the above described charging. By this pressurization and compression, a total thickness (volume) of the all-solid state secondary battery is decreased, and an energy density is improved.

The pressurizing step is preferably performed after the charging step and before the discharging step.

In the step of pressurizing the positive electrode active material layer, it is sufficient that at least the positive electrode active material layer can be compressed. In consideration of the compression of the positive electrode active material layer after charging, it is preferable to compress the positive electrode active material layer by pressurizing the above described laminate as the all-solid state secondary battery precursor.

The method of pressurizing and compressing the positive electrode active material layer is not particularly limited, various known pressurizing methods can be applied, and press pressurizing (for example, press pressurizing using a hydraulic cylinder press machine) is preferable. The pressure in this step is not particularly limited as long as the pressure can collapse the voids, and is preferably higher than pressurization and restraint in the charging step. The pressure is appropriately determined in accordance with a kind, content, amount of voids, or the like of the positive electrode active material, but for example, the pressure is preferably set in a range of 10 to 1000 MPa. The lower limit of the pressure is more preferably 40 MPa or more, further preferably 50 MPa or more, particularly preferably 60 MPa or more, and the upper limit is more preferably 1000 MPa or less, and further preferably 750 MPa or less. The pressing time is not particularly limited, and may be short (for example, within several hours) or long (for one day or more).

The positive electrode active material layer may be heated with the pressurization and compression, but in the present invention, the pressurization and compression is preferably performed without heating, and for example, the pressurization and compression is preferably performed at an environmental temperature of 10° C. to 50° C. An atmosphere during the pressurization and compression is not particularly limited, and may be a mixed atmosphere of the solid electrolyte composition.

The pressurizing step is preferably performed without applying a voltage (charging and discharging is not performed) to at least the positive electrode active material layer, generally the all-solid state secondary battery precursor. In the present invention, "without applying a voltage" means to include not only an aspect in which no voltage is applied to the positive electrode active material layer and the like, but also an aspect in which a voltage of 2.5 to 3.0 V corresponding to the final voltage of the initial discharge is applied.

The compression of the positive electrode active material layer is performed until a void volume of the positive electrode active material layer after compressing is smaller than a void volume of the positive electrode active material layer after charging. Ideally, this compression is performed until the voids derived from the negative electrode active material precursor are completely collapsed (until the reaching the void volume of the positive electrode active material layer before charging), but in reality, the compression is performed to near the void volume of the positive electrode active material layer before charging. For example, the compression is performed to a void volume of 1.5%, preferably 1%, and more preferably 0.5% higher than the void volume of the positive electrode active material layer before charging.

This pressurizing step differs from the pressurization and restraint that is preferably applied in a case of using the all-solid state secondary battery, from the viewpoint of the positive electrode active material layer is compressed (voids are collapsed).

As described above, the pressurizing step is performed to manufacture the initially charged all-solid state secondary battery.

Next, the entirety of the obtained laminate or the all-solid state secondary battery can be appropriately restrained and pressurized in a laminating direction to manufacture the all-solid state secondary battery. The restraining and pressurizing pressure at this time is not particularly limited, but is preferably 0.05 MPa or more, and more preferably 1 MPa. The upper limit is, for example, preferably less than 10 MPa, and more preferably 8 MPa or less.

It is possible to manufacture an all-solid state secondary battery having a form in which the negative electrode active material layer is not formed in advance by providing necessary members to the laminate manufactured in this manner.

<Initialization of All-Solid State Secondary Battery>

Each all-solid state secondary battery manufactured by each method of manufacturing an all-solid state secondary battery described above is preferably initialized after being manufactured or before being used. The initialization is not particularly limited, and it is possible to initialize the all-solid state secondary battery by, for example, carrying out charging and discharging in a state where the pressing pressure is increased and then decreasing the pressure up to a pressure at which the all-solid state secondary battery is ordinarily used.

As a charging method in the initialization (initial charging) and conditions, for example, the method and conditions described in the step of charging the positive electrode active material layer can be applied. The discharge conditions in the initialization are not particularly limited, but examples thereof include the following conditions.

Current: 0.05 to 1 mA/cm$^2$
Voltage: 2.5 to 3.0 V
Charging time: 1 to 20 hours
Temperature: 25° C. to 60° C.

By this discharging step, metal ions are generated from the negative electrode active material layer or the vicinity thereof and reach the positive electrode active material layer. In the all-solid state secondary battery in the form in which the negative electrode active material layer is not formed in advance, the metal precipitated by executing the charging step is ionized and migrates to the positive electrode active material layer in the discharging step (capacity of the negative electrode active material layer is reduced or disappear). In the all-solid state secondary battery manufactured using the negative electrode active material precursor, the voids derived from the negative electrode active material precursor are not completely filled with the metal ions reaching the positive electrode active material layer, and the positive electrode active material layer has voids (voids remain) that are collapsed in the pressurizing step described later. The void volume of the positive electrode active material layer after discharging at this time is not particularly limited.

In each method of manufacturing an all-solid state secondary battery, in a case where the all-solid state secondary battery is restrained and pressurized, the all-solid state secondary battery may be released from a state of being restrained and pressurized after manufacture, but it is preferable to maintain the state of being restrained and pressurized from the viewpoint that discharge deterioration can be prevented.

Even in a case where constituent layers of the all-solid state secondary battery are formed of solid particles, the all-solid state secondary battery in which an occurrence of short-circuits is suppressed can be manufactured by the method of manufacturing an all-solid state secondary battery according to the embodiment of the present invention. The occurrence of short-circuits can be suppressed even in a layer consisting of graphite as the negative electrode active material layer and a layer consisting of the precipitated alkali metal or alkaline earth metal. In particular, the all-solid state secondary battery employing the lithium metal layer that is preferable as the negative electrode active material layer exhibits higher charging and discharging cycle characteristics and can greatly improve the reliability of suppressing the occurrence of short-circuits.

The method of manufacturing an all-solid state secondary battery of the present invention, it is not necessary to provide a layer or the like for suppressing penetration of dendrites other than the solid electrolyte layer, the negative electrode active material layer, and the positive electrode active material layer, a layer thickness of the all-solid state secondary battery can be reduced. Therefore, even though the dendrite penetration inhibiting surface is provided, it is possible to avoid reduction in battery capacity. In addition, since the dendrite penetration inhibiting surface can be formed by the shearing processing, steps are simple, and processing cost can be reduced as compared with a vapor phase method or high-temperature sintering which require vacuum. Furthermore, since the shearing processing is physical processing at a low temperature, the heating processing can be applied even though the solid electrolyte layer contains an organic binder, an organic porous base material, and the like. In particular, in the case of a preferable form in which the sulfide-based inorganic solid electrolyte is used as the plastic solid particles, the solid electrolyte layer can be formed of the sulfide-based inorganic solid electrolyte having high ion conductivity, and thus, low interfacial resistance can be realized.

In addition, in a case where a metal film is provided on the shearing processed surface, as described above, it is possible to more effectively prevent the dendrites from reaching the positive electrode. Furthermore, in a case where the positive electrode active material layer is formed by using the positive electrode composition containing the negative electrode active material precursor, as described above, lithium ions can be replenished. Furthermore, even though the Si negative electrode consisting of a silicon material or a silicon-containing alloy having a large irreversible capacity is used and even in the form in which the negative electrode active material layer is not formed in advance, sufficient battery characteristics can be imparted, and the dendrites can be more effectively suppressed from reaching the positive electrode. In a case where the positive electrode active material layer is pressurized and compressed after charging, as described above, even in the Si negative electrode or the form in which the negative electrode active material layer is not formed in advance, it is possible to reduce the thickness of the positive electrode active material layer itself by collapsing voids formed by decomposition of the negative electrode active material precursor, and to further improve the (volume) energy density while maintaining sufficient battery characteristics.

[Use of All-Solid State Secondary Battery]

The all-solid state secondary battery according to the embodiment of the present invention can be applied to a variety of usages. Application aspects are not particularly limited, and in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state laminated secondary battery can be used for a variety of military usages and universe usages. In addition, the all-solid state laminated secondary battery can also be combined with solar batteries.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described.

Synthesis Example 1: Synthesis of Sulfide-Based Inorganic Solid Electrolyte Li—P—S-Based Glass As a sulfide-based inorganic solid electrolyte, Li—P—S-based glass was synthesized with reference to a non-patent document of T. Ohtomo, A. Hayashi, M. Tatsumisago, Y.

Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide (Li$_2$S, manufactured by Aldrich-Sigma, Co. LLC. Purity: >99.98%) (2.42 g) and diphosphoruspentasulfide (P$_2$S$_5$, manufactured by Aldrich-Sigma, Co. LLC. Purity: >99%) (3.90 g) were respectively weighed, introduced into an agate mortar, and mixed using an agate muddler for five minutes. The mixing ratio between Li$_2$S and P$_2$S$_5$ (Li$_2$S:P$_2$S$_5$) was set to 75:25 in terms of molar ratio.

66 zirconia beads having a diameter of 5 mm were introduced into a 45 mL zirconia container (manufactured by Fritsch Japan Co., Ltd.), the full amount of the mixture of the lithium sulfide and the diphosphorus pentasulfide was introduced thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, and thereby a yellow powder (6.20 g) of a sulfide-based inorganic solid electrolyte (Li—P—S-based glass) was obtained. The ion conductivity was 0.28 mS/cm. A particle diameter of the Li—P—S-based glass measured by the above described measurement method was 1 μm, and a glass transition temperature (a temperature of an exothermic peak obtained by DSC measurement) in the above described measurement method was 75° C. In the above described indentation test performed by a micro hardness tester, it was confirmed that this Li—P—S-based glass was solid particles exhibiting plastic deformation at 250° C. or lower in that the difference of press-fitting depth was 10% or more.

Example 1

In the present example, an all-solid state secondary battery having a form in which a negative electrode active material layer is formed in advance was manufactured using a lithium metal foil as the negative electrode active material layer.

<Manufacture of Solid Electrolyte Sheet>

100 mg of the synthesized sulfide-based inorganic solid electrolytes (corresponding to plastic solid particles) was placed into a cylinder manufactured by Macor (registered trademark) having an inner diameter of 10 mm, and was pressed (preforming) for 1 minute at 25° C. in an argon gas atmosphere and at which a pressurizing force was set to 180 MPa (step A). In this way, a preformed body consisting of a sulfide-based inorganic solid electrolyte was obtained.

Next, one surface (0.78 mm$^2$) of the obtained preformed body was subjected to brushing processing with a metal brush made of stainless steel in a state of being heated to 200° C. (step B). A rotation speed of the metal brush was 10,000 rpm, and a processing time was 1 minute or more. A shearing force acted by moving the metal brush disposed perpendicular to a surface of the formed body in an in-plane direction. In this manner, a preformed body having a shearing processed surface was obtained.

Next, this preformed body was pressed (main forming) for 1 minute in an argon gas atmosphere, room temperature (25° C.), and the pressurizing force of 550 MPa (step C).

In this manner, a solid electrolyte sheet consisting of the solid electrolyte layer (thickness of 600 μm) having a shearing processed surface was obtained. The shearing processed surface was formed as a thin layer that has a thickness of 0.1 mm or less and that can be peeled off by cleaving (dendrite penetration inhibiting layer, 1% of void volume). The general solid electrolyte layer was formed under this thin layer.

<Manufacturing Negative Electrode Sheet for All-Solid State Secondary Battery>

A lamination sheet was prepared by adhering a negative electrode collector consisting of a copper foil having a thickness of 8 μm to a lithium metal foil having a thickness of 20 μm. This lamination sheet was laminated on the solid electrolyte sheet so that the lithium metal foil of this lamination sheet was in contact with the shearing processed surface of the manufactured solid electrolyte sheet, and the lamination sheet was pressure-bonded in an argon gas atmosphere, at 25° C., and under the pressurizing force set to 24 MPa for 1 minute.

In this manner, a negative electrode sheet for an all-solid state secondary battery provided with the solid electrolyte layer, and the negative electrode active material layer and the negative electrode collector, which are disposed on the shearing processed surface of the solid electrolyte layer in this order, was produced.

<Manufacturing of All-Solid State Secondary Battery>

First, a positive electrode sheet consisting of a positive electrode collector and a positive electrode active material layer was produced.

180 zirconia beads having a diameter of 5 mm were placed into a 45 mL zirconia container (manufactured by Fritsch Japan Co., Ltd.), and 2.0 g of the Li—P—S-based glass synthesized in the above described Synthesis Example 1, 0.1 g of styrene butadiene rubber (product code 182907, manufactured by Sigma-Aldrich Co. LLC), and 22 g of octane as a dispersion medium were placed thereinto. Thereafter, the container was set in a planetary ball mill P-7 (trade name) manufactured by Fritsch Japan Co., Ltd., stirring was carried out at a temperature of 25° C. and a rotation speed of 300 rpm for two hours Thereafter, 7.9 g of the positive electrode active material LiNi$_{0.85}$Co$_{0.10}$Al$_{0.05}$O$_2$ (lithium nickel cobalt aluminum oxide) was placed into the container, the container was set again in the planetary ball mill P-7, and a composition was continuously mixed at a temperature of 25° C. and a rotation speed of 100 rpm for 15 minutes. In this way, a positive electrode composition was obtained.

Next, the positive electrode composition obtained as described above (basis weight of the positive electrode active material with respect to a circular area of a diameter of 10 mm is 11 mg) was applied on an aluminum foil having a thickness of 20 μm, the aluminum foil serving as an electrode collector, with a baker-type applicator, and then the positive electrode composition was dried by heating at 80° C. for 2 hours. Thereafter, the positive electrode composition that was dried to have a predetermined density was pressurized (600 MPa, 1 minute) by using a heat press machine while being heated (120° C.). In this way, a positive electrode sheet having a positive electrode active material layer with a film thickness of 110 μm was produced.

Next, the positive electrode active material layer of a disk-shaped sheet punched into a disk shape having a diameter of 10 mm from the produced positive electrode sheet is adhered on a surface side of the solid electrolyte layer in the negative electrode sheet for an all-solid state secondary battery (the disk-shaped sheet punched into the disk shape having a diameter of 10 mm), the surface differing from the shearing processed surface, by applying a solution prepared by mixing an electrolytic solution for a lithium ion battery with PEO. In this manner, a laminate including the negative electrode collector, the negative electrode active material layer, the solid electrolyte layer including the dendrite penetration inhibiting layer, the positive electrode active material layer, and the positive electrode collector was obtained.

The entirety of the obtained laminate was restrained in the laminating direction with a restraining pressure of 8 MPa to manufacture an all-solid state secondary battery having a layer structure shown in FIG. 1.

Example 2

In the present example, the all-solid state secondary battery having a form in which a negative electrode active material layer is not formed in advance was manufactured.

A negative electrode collector sheet consisting of a copper foil having a thickness of 8 μm was prepared. The electrode collector sheet was laminated on the solid electrolyte sheet so that this electrode collector sheet was in contact with the shearing processed surface of the solid electrolyte sheet manufactured in Example 1, and the electrode collector sheet was pressure-bonded in an argon gas atmosphere, at 25° C., and under the pressurizing force set to 24 MPa for 1 minute to obtain a laminate of the negative electrode collector sheet and the solid electrolyte layer.

The positive electrode active material layer of the disk-shaped sheet punched from the positive electrode sheet produced in Example 1 was adhered to a surface of the solid electrolyte layer in this laminate (the disc-shaped laminate punched into the disk shape having a diameter of 10 mm), the surface being opposite to the negative electrode collector sheet, in the same manner as in Example 1, to obtain a laminate consisting of the negative electrode collector, the solid electrolyte layer including the dendrite penetration inhibiting layer, the positive electrode active material layer, and the positive electrode collector.

The entirety of the obtained laminate was restrained in the laminating direction with a restraining pressure of 8 MPa to manufacture an all-solid state secondary battery having a form in which the negative electrode active material layer is not formed in advance.

Example 3

In the present example, the all-solid state secondary battery having a form in which a negative electrode active material layer is not formed in advance was manufactured.

A Zn film having a thickness of 50 nm was formed on the surface of the copper foil having a thickness of 8 μm by sputtering. An all-solid state secondary battery having the Zn film between the negative electrode collector (copper foil) and the shearing processed surface of the solid electrolyte sheet was manufactured in the same manner as in the manufacture of the all-solid state secondary battery of Example 2, except that in the manufacture of the all-solid state secondary battery of Example 2, a copper foil having a thickness of 8 μm, on which the Zn film having a thickness of 50 nm was formed, was used instead of the copper foil having a thickness of 8 μm, and the Zn film and the shearing processed surface of the solid electrolyte sheet were laminated and pressure-bonded in a state of being in contact with each other. This all-solid state secondary battery includes the solid electrolyte sheet having the Zn film (the film formed of a metal capable of forming an alloy with lithium) on the shearing processed surface of the preformed body.

Example 4

In the present example, the all-solid state secondary battery having a form in which a negative electrode active material layer is not formed in advance was manufactured.

An all-solid state secondary battery provided with the positive electrode active material layer containing the negative electrode active material precursor was manufactured in the same manner as in the manufacture of the all-solid state secondary battery of Example 2, except that in the manufacture of the all-solid state secondary battery of Example 2, the following positive electrode composition (the production of the positive electrode sheet was the same as in Example 1) was used.

-Preparation of Positive Electrode Composition- 180 zirconia beads having a diameter of 5 mm were placed into a 45 mL zirconia container (manufactured by Fritsch Japan Co., Ltd.), and 2.0 g of the Li—P—S-based glass synthesized in the above described Synthesis Example 1, 0.1 g of styrene butadiene rubber (product code 182907, manufactured by Sigma-Aldrich Co. LLC), and 22 g of octane as a dispersion medium were placed thereinto. Thereafter, the container was set in a planetary ball mill P-7 (trade name) manufactured by Fritsch Japan Co., Ltd., stirring was carried out at a temperature of 25° C. and a rotation speed of 300 rpm for two hours Thereafter, 7.11 g of the positive electrode active material $LiNi_{0.85}Co_{0.10}Al_{0.05}O_2$ (lithium nickel cobalt aluminum oxide) and 0.79 g of $Li_2CO_3$ (lithium carbonate, average particle diameter 1 μm) as the negative electrode active material precursor were placed into the container, the container was set again in the planetary ball mill P-7, and a composition was continuously mixed at a temperature of 25° C. and a rotation speed of 100 rpm for 15 minutes. In this way, a positive electrode composition containing the negative electrode active material precursor was prepared.

Example 5

In the present example, an all-solid state secondary battery that has the positive electrode active material layer in which the laminate manufactured in Example 4 is used to be pressurized and compressed and that has the form in which a negative electrode active material layer is not formed in advance was manufactured.

Initial charging of the laminate manufactured in Example 4 (the all-solid state secondary battery restrained at 8 MPa in the laminating direction) was performed under conditions of a current of 0.09 mA/cm$^2$, a voltage of 4.25 V, a charging time of 20 hours, and a temperature of 25° C. Lithium ions generated from lithium carbonate were precipitated as lithium metal on the surface of the negative electrode collector, by this initial charging, and carbon dioxide gas was released outside the laminate. In a case where the positive electrode active material layer after the initial charging was observed, the void volume (according to the above measurement method) was increased by 7% with respect to the positive electrode active material layer before the initial charging.

-Pressurizing Step-

After the initial charging, the laminate is unrestrained, a pressure of 60 MPa is applied between the positive electrode collector and the negative electrode collector, and the all-solid state secondary battery after the initial charging is pressurized in the laminating direction to compress the positive electrode active material layer. This compression was performed for 1 hour using a heat press machine at room temperature (25° C.) without applying a voltage (charging and discharging) to the disc-shaped laminate.

As a result of observing this positive electrode active material layer, the positive electrode active material layer was compressed (thinned) in a state where the void volume was increased by 1% with respect to the positive electrode active material layer before the initial charging (a state where voids having a void volume of 6% in the positive electrode active material layer before the initial charging were collapsed).

The entirety of the laminate obtained by charging and compression in this manner was restrained in the laminating direction with a restraining pressure of 8 MPa to manufacture an all-solid state secondary battery having the pressurized and compressed positive electrode active material layer.

Comparative Example 1

In this example, a lithium metal foil was used as the negative electrode active material layer to manufacture an all-solid state secondary battery in which the negative electrode active material layer was formed in advance (without the dendrite penetration inhibiting layer).

That is, an all-solid state secondary battery was manufactured in the same manner as in Example 1, except that in Example 1, the step A and step B in the manufacture of the solid electrolyte sheet were not performed (dendrite penetration inhibiting layer was not formed).

Comparative Example 2

In this example, a lithium metal foil was used as the negative electrode active material layer to manufacture an all-solid state secondary battery in which the negative electrode active material layer was formed in advance (without the dendrite penetration inhibiting layer).

That is, an all-solid state secondary battery was manufactured in the same manner as in Example 1, except that in Example 1, the step A and step B in the manufacture of the solid electrolyte sheet were not performed (dendrite penetration inhibiting layer was not formed), and furthermore, the temperature of the main forming in the step C was changed to 200° C.

<Initialization>

Each of the all-solid state secondary batteries produced in Examples 1 to 4 and Comparative Examples 1 and 2 was initialized by charging and discharging for one cycle at 0.09 mA/cm$^2$.

In the all-solid state secondary battery of Example 4, lithium ions generated from lithium carbonate were precipitated as lithium metal on the surface of the negative electrode collector, by this initialization (initial charging), and carbon dioxide gas was released outside the battery. In a case where the positive electrode active material layer after the initial charging was observed, the void volume (according to the above measurement method) was increased by 7% with respect to the positive electrode active material layer before the initial charging.

<Evaluation: Charging and Discharging Cycle Characteristic Test>

(Rapid) charging and discharging was performed using each of the all-solid state secondary batteries produced above under the following conditions, and the charging and discharging cycle characteristic test was performed.

Regarding the all-solid state secondary battery of Example 5, before performing the following charging and discharging cycle characteristic test, the all-solid state secondary battery was restrained in the laminating direction with a restraining pressure of 8 MPa, and was subjected to initial discharging to be initialized under conditions of 0.09 mA/cm$^2$, a final voltage of 2.5 V, a charging time of 18 hours, and a temperature of 25° C.

(Conditions)

At 25° C., a charging and discharging cycle, in which charging was performed to 4.25 V at a current density of 2.2 mA/cm$^2$ and discharging was performed to 2.5 V at a current density of 2.2 mA/cm$^2$, was set as one cycle and was repeated 30 or 40 cycles.

In a case where internal short-circuits occurred, the charging was not completed. Therefore, the charging was completed for 50 hours and discharged. The presence or absence of internal short-circuits was determined by the presence or absence of a rapid voltage drop during charging.

The charging and discharging cycle characteristics were evaluated by obtaining a charging and discharging efficiency from the following Expression for each cycle. In the all-solid state secondary batteries of Comparative Example 2, a short-circuit occurred in one cycle, and thus the evaluation was performed by the charging and discharging efficiency after one cycle.

Charging and discharging efficiency=Discharging capacity/charging capacity

The results of the charging and discharging cycle characteristic test are shown below.

Example 1: All of charging and discharging efficiencies in 30 cycles were stable at 99%.

Example 2: All of charging and discharging efficiencies in 30 cycles were stable at 99% (discharging capacity after 30 cycles was deteriorated to 50%).

Example 3: All of charging and discharging efficiencies in 30 cycles were stable at 99% (discharging capacity after 30 cycles was 90%).

Example 4: All of charging and discharging efficiencies in 40 cycles were stable at 99%.

The same initial discharging capacity as in Example 2 in which the positive electrode active material NCA of 7.9 g was used (the same as the basis weight of the positive electrode active material) was shown.

Example 5: All of charging and discharging efficiencies in 40 cycles were stable at 99%.

The same initial discharging capacity as in Example 2 in which the positive electrode active material NCA of 7.9 g was used (the same as the basis weight of the positive electrode active material) was shown, and it was confirmed that the battery volume was decreased due to the thinned positive electrode active material layer, so that the energy density was improved.

Comparative Example 1: All of the charging and discharging efficiencies in 30 cycles were 80% or less.

Comparative Example 2: The charging and discharging efficiency in one cycle was 50% or less.

As is clear from the above results, without executing the step A and step B specified in the present invention, in the all-solid state secondary batteries of Comparative Example 1 and Comparative Example 2 provided with the general solid electrolyte layer, the occurrence of internal short-circuits due to dendrites was not effectively suppressed. Furthermore, the charging and discharging cycle characteristics were also deteriorated. Particularly in Comparative Example 2, the growth of dendrites cannot be blocked even performing the charging and discharging in one cycle. It is considered that cracks were generated in the formed solid electrolyte layer.

On the other hand, all of the all-solid state secondary batteries of Examples including the solid electrolyte layer on which the dendrite penetration inhibiting layer is formed by performing the step A and step B specified in the present invention can effectively suppress the occurrence of internal short-circuits due to dendrites. In addition, the all-solid state secondary batteries of the respective examples exhibit high charging and discharging cycle characteristics while suppressing the occurrence of internal short-circuits. In particular, in the all-solid state secondary battery of Example 1 employing the lithium foil as the negative electrode active material layer, all of the charging and discharging efficiencies in 30 cycles are 99%, and the higher discharging capacity maintaining characteristics than that of the all-solid state secondary battery of Example 2 employing the layer on which lithium metal was precipitated as the negative electrode active material layer is exhibited (a high reliability is exhibited). The all-solid state secondary battery of Example 3 having the Zn film between the negative electrode collector (copper foil) and the shearing processed surface of the solid electrolyte sheet had a discharging capacity of 90% after 30 cycles. As a result, the time until short-circuits occur can be lengthened, and the discharging capacity maintenance characteristics are also improved. In addition, in the all-solid state secondary battery of Example 4 provided with the positive electrode active material layer containing the negative electrode active material precursor, the occurrence of short-circuits can be suppressed, and a decrease in battery capacity is also prevented, so that improvement of the energy density can be expected. Furthermore, the all-solid state secondary battery of Example 5 in which the positive electrode active material layer containing the negative electrode active material precursor was pressurized and compressed after the initial charging exhibits the same discharging capacity as Example 2, and the volume energy density is further improved as compared with the all-solid state secondary battery of Example 4. In addition, it can be seen that all of the charging and discharging efficiencies in 40 cycles are stable at 99%, and the occurrence of short-circuits can be suppressed. Furthermore, an interface peeling between the negative electrode active material layer and the solid electrolyte layer due to volume expansion and contraction of the negative electrode active material layer can be prevented, and the high discharging capacity can be maintained.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. A method of manufacturing an all-solid state secondary battery, comprising:
   forming a solid electrolyte sheet, comprising:
      a step of performing preforming on inorganic solid electrolyte particles containing solid particles plastically deformable at 250° C. or lower; and
      a step of performing shearing processing on one surface of the obtained preformed body,
      wherein a solid electrolyte layer consisting of the inorganic solid electrolyte particles is formed;
   forming a negative electrode sheet, comprising:
      forming a negative electrode active material layer on a shearing processed surface of the solid electrolyte layer in the solid electrolyte sheet by pressure-bonding and laminating a negative electrode active material; and
   forming a positive electrode active material layer on a surface of the negative electrode sheet, the surface being opposite to the negative electrode active material layer.

2. The method of manufacturing an all-solid state secondary battery according to claim 1, wherein during the forming of the solid electrolyte sheet, the step of performing the shearing processing is performed by heating the preformed body to a temperature higher than a glass transition temperature of the solid particles.

3. The method of manufacturing an all-solid state secondary battery according to claim 1, wherein during the forming of the solid electrolyte sheet, a vertical pressure is applied to the preformed body subjected to the shearing processing to carry out main forming.

4. The method of manufacturing an all-solid state secondary battery according to claim 1, wherein during the forming of the solid electrolyte sheet, a film formed of a metal capable of forming an alloy with lithium is provided on the shearing processed surface of the preformed body.

5. The method of manufacturing an all-solid state secondary battery according to claim 1, wherein the positive electrode active material layer is formed using a positive electrode composition containing a positive electrode active material and a negative electrode active material precursor.

6. The method of manufacturing an all-solid state secondary battery according to claim 5, wherein the positive electrode active material layer is charged after being formed.

7. The method of manufacturing an all-solid state secondary battery according to claim 6, wherein the charged positive electrode active material layer is pressurized and compressed.

* * * * *